(12) United States Patent
Sehr

(10) Patent No.: US 6,999,936 B2
(45) Date of Patent: Feb. 14, 2006

(54) ELECTRONIC TICKETING SYSTEM AND METHODS UTILIZING MULTI-SERVICE VISITOR CARDS

(76) Inventor: Richard P. Sehr, 2276 Creek Bed Ct., Santa Clara, CA (US) 95054

( * ) Notice: Subject to any disclaimer, the term of this patent is extended or adjusted under 35 U.S.C. 154(b) by 557 days.

(21) Appl. No.: 09/067,093

(22) Filed: Apr. 26, 1998

(65) Prior Publication Data

US 2001/0018660 A1   Aug. 30, 2001

Related U.S. Application Data

(60) Provisional application No. 60/045,768, filed on May 6, 1997.

(51) Int. Cl.
*G06F 17/60* (2006.01)
(52) U.S. Cl. ............................................. 705/5; 705/16
(58) Field of Classification Search .................... 705/1, 705/5, 41, 69, 104, 65; 340/825.07; 380/24; 235/492, 384; 707/104
See application file for complete search history.

(56) References Cited

U.S. PATENT DOCUMENTS

| | | | | |
|---|---|---|---|---|
| 5,003,520 A | * | 3/1991 | Grieu et al. .................. 368/90 |
| 5,173,883 A | * | 12/1992 | Ilie et al. ...................... 368/90 |
| 5,204,663 A | * | 4/1993 | Lee et al. ................... 340/5.28 |
| 5,235,565 A | * | 8/1993 | Aschenbrouich et al. ...... 368/90 |
| 5,278,395 A | * | 1/1994 | Benezet ....................... 235/384 |
| 5,326,104 A | * | 7/1994 | Pease et al. ................... 463/18 |
| 5,333,257 A | * | 7/1994 | Merrill et al. ............... 345/467 |
| 5,396,218 A | * | 3/1995 | Olah .......................... 340/568 |
| 5,440,109 A | | 8/1995 | Hering ....................... 235/384 |
| 5,475,205 A | | 12/1995 | Behm, Jr. ................... 235/375 |
| 5,490,251 A | * | 2/1996 | Clark et al. ............. 395/200.67 |
| 5,493,105 A | * | 2/1996 | Desai ......................... 235/375 |
| 5,514,857 A | | 5/1996 | Corless ....................... 235/384 |
| 5,557,518 A | * | 9/1996 | Rosen ......................... 380/24 |
| 5,566,327 A | * | 10/1996 | Sehr ........................... 707/104 |
| 5,580,311 A | | 12/1996 | Haste, III .................... 463/29 |
| 5,590,038 A | * | 12/1996 | Pitroda ........................ 705/41 |
| 5,754,654 A | * | 5/1998 | Hiroya et al. ................ 380/24 |
| 5,768,379 A | * | 6/1998 | Girault et al. ............... 380/21 |
| 5,797,126 A | * | 8/1998 | Helbling et al. .............. 705/5 |
| 5,864,623 A | * | 1/1999 | Messina et al. ........... 340/5.86 |
| 5,897,620 A | * | 4/1999 | Walker ......................... 705/5 |
| 5,901,303 A | * | 5/1999 | Chew ......................... 711/115 |

(Continued)

OTHER PUBLICATIONS

"Electronic Commerce: Credit Card Firms Plan 'Digital Money' Future." Network World. (Apr. 24, 1995) p. 47 [pp. 1-5], Apr. 21, 1995.*

(Continued)

*Primary Examiner*—James W. Myhre

(57) ABSTRACT

A ticketing system and methods that encompass a plurality of entities, such as an event organizer, admission center, service providers and a visitor population, so as to automatically compile, issue, utilize and process ticketing cards for the admission to sporting events and other leisure & entertainment events. The portable, ticketing cards are realized by handheld devices, such as smart credit and/or debit card technology or pocket-size computers, and have the ability to store in the card a computerized ticket template. The cards can also store electronic credit points, or deduct from the card a monetary value or award points previously loaded into the card. Biometrics identification of cardholders, as well as cryptographic certification of card data and database information, can optionally be encoded into the cards, and can be verified and validated at various point-of-service locations upon presentation of the card for admission and for other services.

23 Claims, 4 Drawing Sheets

U.S. PATENT DOCUMENTS 5,936,540 A * 8/1999 Lebet ............... 340/825.07

OTHER PUBLICATIONS

"Financial News: New Device Makes Smart Card Transactions Possible Over Telephone." PR Newswire. (May 24, 1993) pp. 1-7.*

"Electronic Commerce: Credit Card Firms Plan 'Digital Money' Future." Network World. (Apr. 24, 19950 P. 47 [PP. 1-5].*

"Financial News: New Device Makes Smart Card Transactions Possible Over Telephone." PR Newswire. (May 24, 1993) pp. 1-7.*

* cited by examiner

| MULTI - SERVICE CARD |||||
|---|---|---|---|---|
| BUTTON | BUTTON | | | BUTTON |
| CARDHOLDER/VISITOR BACKGROUND |||||
| Label Box  Label Box Box | | | INSTRUCTION-Window | |
| TICKET/PAYMENT OPTIONS |||||
| SELECTION EVENT/FORM || STATUS TICKET/ACCOUNT |||
| ☐ Ticket/Event ☐ Ticket/Event | ☐ Payment Form ☐ Payment/Form | ☐ Date ☐ Location ☐ Seating ☐ Price | ☐ Maximum Amount ☐ Total Spending ☐ Remaining Balance ☐ Payment Due ||
| | INSTRUCTION - Window & SEAT SELECTION |||  |
| ACCESS CONTROL || CERTIFICATION || SECURITY |
| ☐ Type . . . ☐ Type || ☐ Item/Entity . . . ☐ Item/Entity || ☐ Encrypt/Decrypt ☐ Encode/Decode Instruction - Window |
| AUDIT TRAIL |||||
| DATE | LOCATION | SERVICE PROVIDED/ACTIVITY PERFORMED || EXPLANATIONS |
| xx/xx/xx . . . . | Address . . . . | Description, Summary Statements, etc. . . . . || Comment/Remark . . . . |

FIG. 4

ELECTRONIC TICKETING SYSTEM AND METHODS UTILIZING MULTI-SERVICE VISITOR CARDS

This application claims the Provisional Patent Application Ser. No. 60/045,768, filed May 6, 1997.

BACKGROUND OF THE INVENTION

The system and methods are intended to be used throughout the leisure & entertainment industry, including by an event organizer, which sponsors and facilitates various entertainment events, such as sporting programs or other recreational activities to be accessed via a portable ticketing card; an admission center, which controls admission to and exit from the events while communicating with the card; a service provider, which renders a plurality of products and services, such as various merchandises, financial services, or other cardholder services; and by a visitor, who attends the events and purchases products or services from the service provider.

The system deploys a plurality of functional components and a set of computer programs to implement its operational tasks, including the communications of data and the usage of the visitor card between and among the above system user.

The functional components encompass, for example, PCs or other computing platforms, POS-terminals and PIN-tablets, ATM-machines, card read/write devices, biometrics boxes and other computer peripherals, and the visitor card per se. These components are connected via a multi-directional communications link to allow the exchange of data/information between and among the systems entities including the cardholder. The system components are off-the-shelf hardware devices that can be purchased from retailers/computer stores, procured from component manufacturers or its distributors, or acquired from providers of networking/communications services. The communication links can be implemented via the Internet or any other commercial available, wire-based or wireless network technology.

The computer programs perform the house-keeping assignments, computing and decisioning functions, application-specific routines, and the communications/networking tasks necessary for the system's operations and card usage. These programs further include security means, such as cryptographic schemes, digital signatures and authenticity codes, to protect the system, cardholders and card contents against fraudulent use. The software programs reside within the system's components including the electronic visitor card. In this way, a cardholder/system user can instruct the system to select and execute a plurality of computerized means or operational functions under the auspices of the software programs and the guidance of command buttons, template files and pull-up/pop-down menus embedded into the system or stored in the card.

The system further comprises a database scheme for storing a set of data and information in a distributed manner among a plurality of database components associated with the plurality of system users, including the visitor card. The database scheme comprises means for automatically interchanging a selected number of data elements, from among said set of data/information, between and among all database components via the communication link whenever such data elements are inputted including modified by a particular system entity. In this way, the network of system database components, including the visitor card per se, acts and behaves as a single integrated database that always contains and automatically delivers—anytime, anywhere—the most up to date set of those data and information.

SUMMARY OF THE INVENTION

Based upon the features and objectives of the admission system and methods, advantages of this invention include reduced administrative costs, improved productivity, better quality of service, and higher revenues associated with the issuance, usage, and processing of the computerized cards as compared to the deployment of paper/plastic-based tickets and of conventional payment methods.

The lower administrative costs are the result of less personnel needed for automated admissions as compared to controlling and following-up on paper-based documents or printed media; of less resources and telecommunications costs required to collect and clear electronic payments as compared to cash, checks or plastic-based payments; and of reduced fraud facilitated via the card-based security features.

The increased productivity is the result of substituting time consuming, labor intensive, and error-prone manual operations—associated with traditional document processing platforms or with conventional payment environments—by the system's computerized means; as well as of streamlining repetitive tasks via electronic templates and automated communications exchange.

The improved quality of service—when using the computerized card—is the result of achieving faster admission or improved throughput at the point-of-service, more service or product selections to choose from, up-to-date information available for micromarketing and inventory or money management purposes, and rendering of services from remote locations.

Higher revenues will be achieved by allowing the visitors to earn frequent attendance and shopper points, which will lead to more loyal visitors and increased spending habits. The card can also generate incremental sales revenues by renting out card-space to corporate sponsors, such as for promotional programs or co-branding schemes.

It is an objective of the present invention to provide an electronic ticketing system and methods which utilize computerized cards for the automated admission to events, purchase of goods and services, and the rendering of other cardholder entitlements.

It is further an objective of the invention to provide a portable card to store, process and communicate electronic templates representing traditional tickets or the like admission documents; as well as electronic payment forms representing monetary values.

It is further an objective of the invention to provide for a method of compiling the card data elements, which are also stored and maintained throughout a plurality of remote database components, and of issuing the card to a legitimate cardholder, which is entitled to use the card for a predefined purpose.

It is further an objective of the invention to provide for a method of admitting the cardholder to a particular event based on an electronic ticket and related admission rights stored in the visitor card, and of verifying that the card data is authentic.

It is further an objective of the invention to provide for a method of using the visitor card for the purchase of goods and services offered by the plurality of service providers, and of determining if the card-based payment means is valid.

It is further an objective of the invention to provide for a method of rendering a plurality of value-added services via the corresponding service codes stored in the visitor cards; these service codes define and protect the attributes and quantity of a particular service to be provided.

It is further an objective of the invention to provide for a method of preventing the rendering of a predetermined service to a cardholder who is not qualified therefor, such as the sale of alcoholic beverages to minors.

It is further an objective of the invention to provide for a method of coupling the ticketing card to a remote database, and for downloading into the card a set of data and information or for communicating to the database selected card data or cardholder information.

BRIEF DESCRIPTION OF THE DRAWINGS

FIG. 4 is a block diagram of one embodiment of the electronic ticketing card of the present invention.

DESCRIPTION OF A PREFERRED EMBODIMENT

This invention relates to an automated admission system and methods for facilitating via a portable visitor card device a plurality of services, comprising storing admission rights, service entitlements, and cardholder considerations into the visitor card; loading monetary values and electronic payment forms in the card; issuing and using the card for admission and purchases of goods and services; rendering the services requested and clearing the payments made via the card; and communicating card data and related service information between and among the system entities.

Figure 1:
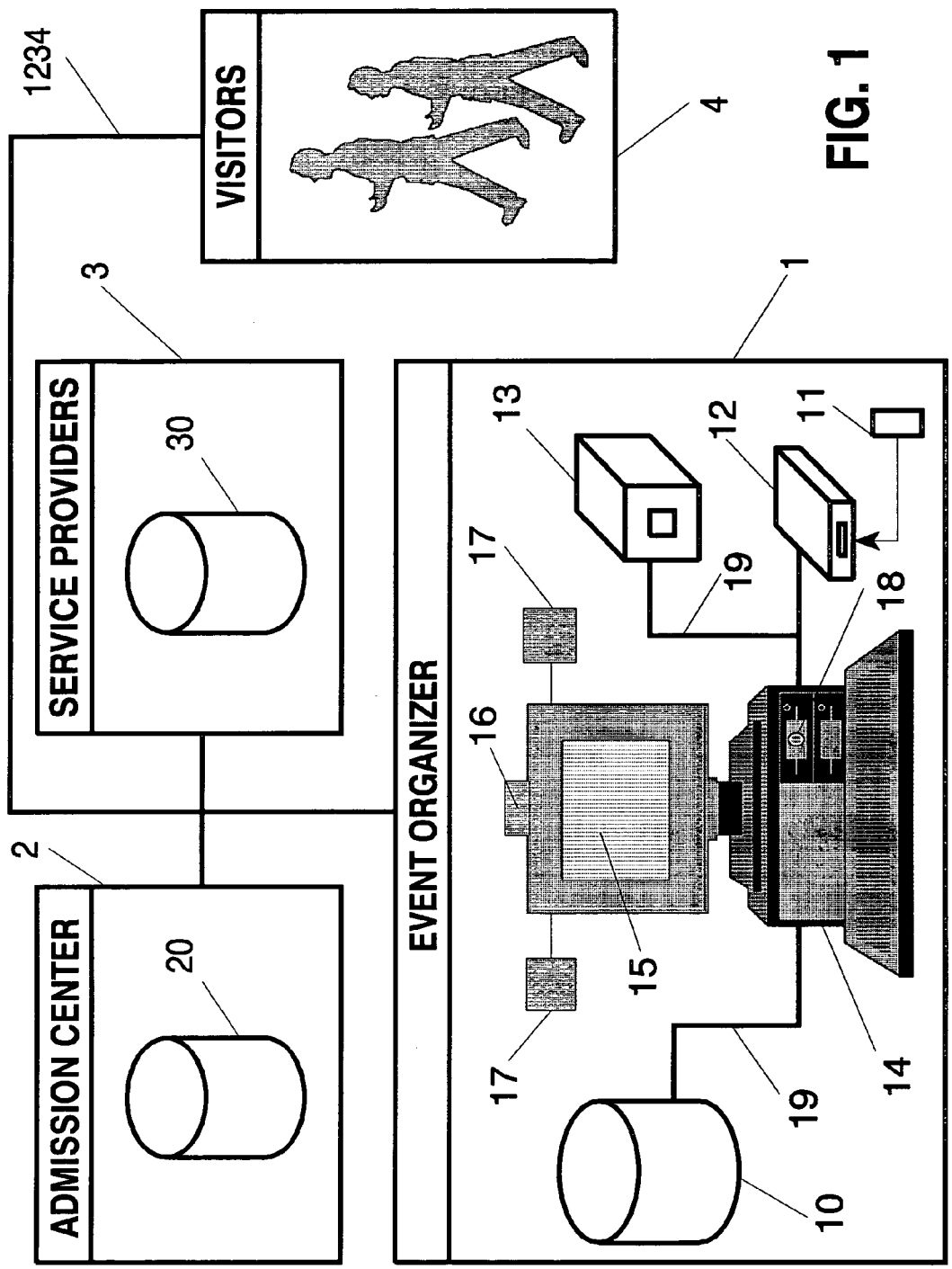
FIG. 1 is a block diagram illustrating one embodiment of an electronic admission system, including the system's communication links and the structural components of the event organizer.

FIG. 1 depicts the functional components of a preferred admission system in accordance with the principles of the invention. The system and methods allow the issuance of a multi-service visitor card to individuals for the admission to events such as sporting activities or other entertainment programs, as well as for the electronic rendering of services. To implement the system's operational tasks, commercially available hardware components and various software programs will be employed. The hardware provides the computing infrastructure and the communication data links that integrate a plurality of remote system entities including the visitor card into a network. The computer software packages perform house-keeping functions, application-specific routines, networking and communication procedures, and utility tasks. This software also includes security means, such as cryptographic software programs and authenticity files, to protect the system information and card contents against fraudulent use. The hardware and software are distributed throughout the system entities including the visitor card.

The Event Organizer (1) represents a corporate entity or individual that facilitates various entertainment programs and related activities, such as the organizing of sporting events and the rendering of products and services related thereto. The event organizer can include owners of professional sports teams and the management firm that operates and maintains the sports stadium those teams compete within. Event organizers can also include sponsors of activities performed during the sporting event, as well as underwriters of services offered to the cardholders prior to, during, or after the sporting event; for example, sponsors of halftime entertainment activities or endorsers of frequent attendance or purchase programs. Besides sporting events, other occurrences and related services can also be underwritten by event organizers. The promoting of and admission to concerts, subscription to educational programs, or organizing and viewing of car/horse races, are such examples.

The Admission Center (2) provides the computerized means for the automated issuance of visitor cards including the loading of appropriate use rights into the cards, and means for the electronic admission of the cardholder. For example, the center can simulate and implement the tasks performed by the ticket windows and the entrance gates at a sports stadium.

The Service Providers (3) represent the service entities including individuals that support the card's usage and the system's operations, as well as render a plurality of products and services to the visitors attending the event. Such providers comprise, for example, fast food vendors, retail outlets, concession stand owners, promoters of collectors cards, or Internet service and content providers. Providers further include a bank or financial institution that stores an electronic monetary value or other electronic payment means in the card, a credit reporting firm that verifies and guarantees the credit worthiness of the cardholder, a transaction processor that clears and credits the electronic payments made via the card, or a certification center that authenticates cardholders and card data.

The Visitors (4) comprise the sporting audience and consumers that attend the events and purchase products and services provided during or in connection with the event. These visitors also represent the consumers of products and services offered by the event organizer and service providers at remote locations, such as sporting/retailing stores, advanced ticket purchasing stations, automated vending machines, entertainment entities, or providers of on-line services and multimedia offerings.

The distributed databases (10), (20) and (30) are associated with the plurality of remote system entities that comprise the event organizer, admission center and service providers, respectively. The above database scheme comprises database storage means for storing data and information in a distributed manner between and among those remote entities including the portable visitor card. The databases include the data records that relate to the entities and to the visitor card contents. Further included is information including electronic template files, which implement the card's usage and the system's operations. Also stored is card data and system information to support the communications and data security management functions. As a function of the amount and complexity of the data to be stored, this database can be implemented via a variety of storage configurations. Solid state memory, magnetic tape, rotating media, video disks, and optical/laser media, are examples thereof.

A major feature of the admission system is that these remote distributed databases including the visitor card per se, always contain the same set of data that is required to qualify a visitor for admission and service eligibility including payment purposes, when verifying the card-based passage or use rights including monetary values. The availability of this most up-to-date data is guaranteed by the system's build-in mechanism of exchanging data in a real-time manner. In other words, if data changes or service/payment activities are performed by any one of the entities, all other entities including the visitor card will be automatically receiving this new information. Such an incremental exchange is not only fast and reliable, but also cost effective because of significant lower communications expenditures. The visitor card, which can act as a portable database and/or off-line processing unit, also will free the system from lengthy and costly on-line modus of operandi, including on-line verifications and authorizations, while providing the bridge for stand alone or incompatible systems configurations.

The EVENT ORGANIZER employs a plurality of means to compile and authenticate the card contents, communicate data between the card and system entities, manipulate card data and update the system databases, and to exchange information with the admission center and service providers. These means comprise the database (10), visitor card (11), card read/write device (12), biometrics box (13), computing platform (14), and various software programs to implement the application routines and network communication as instructed by the event organizer. These system components are connected via a communication link (19) to allow the exchange of data/information throughout the organizer entity. These local components, including the event organizer per se, are also connected via a global communication link (1234) to the remote system components, including the service providers and admission center. The global data link also allows the visitors to communicate with the system entities via a personal computer or card terminal installed at remote locations, such as the visitor's home, a business office, or public places.

The database (10) stores the data and information needed by the event organizer for the implementation of the operational functions and communications tasks. The database is linked to the other databases distributed among and between the plurality of operational entities—such as the admission center, service providers and the cardholder—that are involved in the gathering, organizing, displaying, evaluating, manipulation, processing, and exchanging of data and information. In addition, this database is used for record-keeping, reporting, and inventory purposes. The database will also store an audit trail concerning the system's operations. This audit trail establishes the concept of non-repudiation with the help of a "Who did What-When-Where" recording; the recording is tamper-proof and non-erasable.

The database comprises data and information relating to the event organizer including events sponsored and items underwritten by the organizer, visitors attending the events and requesting service including purchase of merchandise, service providers doing business with the organizer, and transactions performed between the providers and visitors. The database data includes the name, mailing/business address, telephone number, and other data about the organizer, visitors and service providers. The information relating to the organizer further includes a unique identification number, security keys and access codes for cryptographic purposes and protection schemes, account numbers with banks or service providers, validation codes associated with events sponsored or products and services endorsed by the organizer, and certificate of authentication for the exchange of certified information with other system entities. The database data further includes visitor lists comprising demographics data, identification numbers and attendance records of the visitors; negative files/hot lists about account numbers and visitors with problems; lists of service providers comprising their identification numbers, and validation codes associated with the products and services rendered by those providers; and card authenticity files corresponding to card authenticity codes or identification numbers stored in the visitor cards. Also included is information relating to the terms and conditions of events and service options available to the visitors, to use rights stored in the visitor cards, and to transactions performed including an audit trail established via a visitor card. This latter audit trail may include details about the events attended by the visitors, services rendered, merchandise purchased, and the visitor's admission records and consumption patterns.

The Visitor Cards (11) comprises a handheld card device that is used by the visitors to gain admittance to an event, request various services, and to pay for the purchase of goods and services. The visitor card includes "smart cards" that have a shape similar to plastic bankcards, but with at least one silicon chip/integrated circuit embedded into the card package. Visitor cards can further include PC (Personal Computer) card formats, handheld terminals or any pocket-sized computer configurations. The embedded circuits give the cards database storage means, processing capabilities, and display means. The smart visitor card can therefore input, store, process, output, and display data relating to events, cardholders and system entities, as well as to services rendered via the card. The cards further can display data inputted into or retrieved from the visitor card. The card data can be retrieved (read operation) from or loaded (write operation) into the card via a card read/write device or via traditional data input or retrieval means, such as a keyboard/mouse, pointing device, touch screen, or voice commands. This portable card can operate in a stand-alone or in an on-line modus of operandi.

The Card Read/Write Device (12) can read the visitor card's contents as well as write information into the card; this read/write information can also be displayed onto the card reader. The card data can further be displayed and manipulated within the visitor card or on the monitor of a computer terminal. The visitor card can communicate, via such a read/write module, with the other system components including equipment that captures card data relating to text, graphics, audio or video information. This module can be a stand alone device, incorporated into computer terminals via appropriate plug-in boards, or implemented by the visitor card via appropriate input/output ports.

The Biometrics Box (13) includes means for capturing and digitizing the biometrics characteristics information—such as fingerprints, voice, signature, eye characteristics, or picture/facial features—of a particular visitor. The captured biometrics can be stored in or imprinted onto the visitor card, as well as loaded into the database(s). Captured "live" biometrics can also be compared with biometrics information previously stored in the visitor card or in a remote database, to verify if a cardholder is legitimate.

The Computing Platform (14) can be a multimedia personal computer—as indicated by the monitor/interactive display (15), video camera (16), loud speakers (17), and microphone module (18)—or any other computer configuration, such as application-specific computer terminals, general purpose personal computers, client/server networks, or mainframe-based computer environment. This computing platform performs the processing functions and facilitates the decision logic means required for the system's implementation and the card's usage. Such a computing platform can also be used by the visitors to compile the card contents or request the rendering of services from remote locations (e.g. from their home or business premises). The monitor is used to display data and information that is entered or retrieved by a system user or exchanged with any of the system's databases including the visitor card. The video camera captures fixed or moving images that will be exchanged with other system users, stored in the systems databases, including the visitor card, or imprinted onto the visitor card package. This camera can also be used to capture the biometrics data relating to the visitor's physical appearance. The loud speakers and microphone module represent means to exchange and capture audio data of users or sound information of other subjects under consideration.

The Communication Data Links can be implemented via any commercially available wired or wireless technology, such as cable/telephone lines, INTERNET service networks, or other digital or analog telecommunications media.

Figure 2:
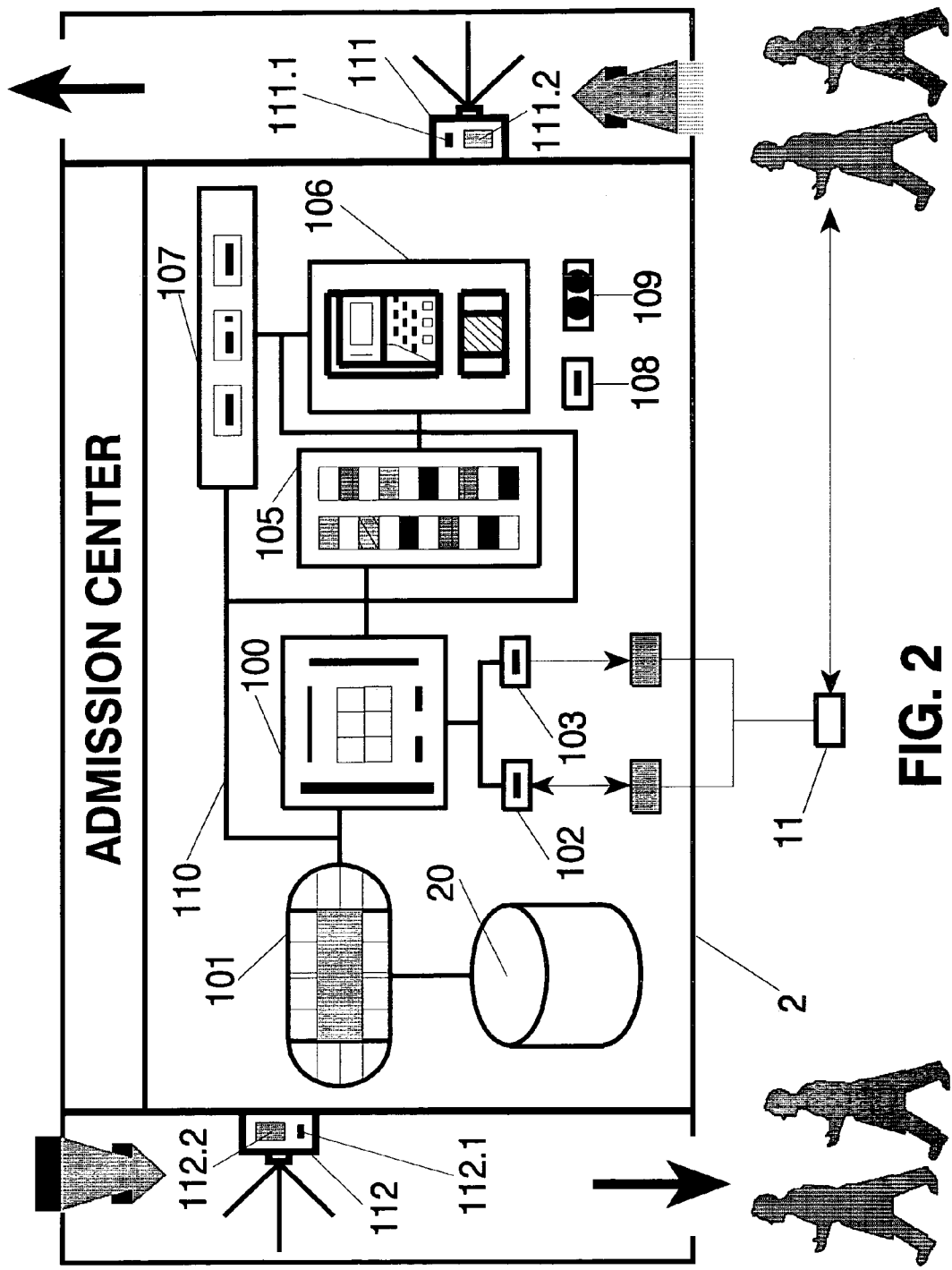
FIG. 2 is a structural diagram illustrating the functional components and interconnect links of the admission center.

FIG. 2 illustrates the block diagram of the ADMISSION CENTER which comprises computerized means including distributed database storage means, for selecting and purchasing visitor cards; loading data and information—such as access rights for sporting and other events, payment options for the purchase of products and services, and security information for protecting the card—into the visitor card; validating and controlling the visitor flow/passage at the entrance and exit gates to and from the premises where the event takes place; and communicating via a graphical user interface with the visitors, visitor card and other system entities. All components of the center are linked together via a local data communication link (110), as well as networked to the rest of the system entities via the global communication link.

The database (20) is distributed within the admission center and connected via the global communication data link to the rest of the remote databases associated with the service providers and the event organizer. The database stores the data and information needed by the admission center to perform the appropriate operational tasks including data communications and security management. Such tasks comprise the storing and retrieving of card data, exchanging information between the visitor card and the system entities, and protecting the card data and information communicated among and between the system components. The database will also store an audit trail concerning the system's operations and the card's usage. This audit trail establishes the concept of non-repudiation with the help of a "Who did What-When-Where" recording; the recording is tamper-proof and non-erasable.

The database data comprises the identification number, access codes, security keys, and validation codes of the admission center. The identification number includes the address/location and business affiliation of the center. This unique identifier can also be used together with a certification key to certify a specific card data, so as to proof the authenticity of that data. The access codes control access to data and information stored throughout the admission center, as well as to products and services provided by the center. The security keys scramble data to be exchanged, decode the received messages, and authenticate information communicated between and among the system entities including the visitor card. The validation codes are associated with rights or considerations loaded into the visitor card, as well as with services rendered and products delivered by a service provider. Such codes act like a computerized product label and electronic receipt in case a service or product is returned for cancellation/exchange; the codes establish proof of origin and authenticity.

The database further comprises visitor lists including the identification number, demographics data, and attendance record of the visitors; negative files/hot lists about account numbers or visitor cards with problems; card authenticity files corresponding to card authenticity codes or identification numbers stored in the visitor cards; the identification numbers of the event organizer and the service providers; a list of all seat assignments; as well as information certified for exchange with other entities. Also included is information relating to the terms and conditions of events and service options available to the visitors, to use rights stored in the visitor cards, and to the audit trail of activities and transactions performed via a visitor card. This later audit trail may include details about the events attended by the visitors, services rendered, merchandise purchased, or the visitor's admission status and ticket selections.

The user interface module (100) allows the visitor to interact with the admission center while instructing the center, and system components networked therein and entities linked thereto, to execute the arithmetic and logical functions required to compile the visitor card contents, and to implement the related computational and storage tasks including communications routines. To select the instructions and input data, various means such as a keyboard/mouse, pen/track ball, voice command, touch screen, or wireless communications technologies, can be used. This module also displays via a monitor or computer screen data inputted or retrieved by the visitor, as well as information provided by the system entities.

The seating map (101) displays the floor plan of the premises (e.g. sports stadium or theater) where the event takes place, communicates with remote ticket or admission centers in real-time, manages the allocation and availability of seats for a particular event, and allows the visitor to select the seating arrangements and related admission rights for that particular event. The map can display the seats that are still available, mark or flag the seats sold or reserved so far, and display all information—such as section, row and seat number—associated with a particular seat. The map can also display, for example, groupings of seats that relate to a particular price range specified by the visitor, as well as the time, date and location a particular event relates to. In addition, the map can also be duplicated onto the score board of a sports stadium, so as to display the available seats and the stadium's occupancy status as visitors pass through the entrance gate. The seating map can also be stored in and displayed onto the visitor card.

The seat assignments can be selected directly on the map or entered via the monitor/screen on the user interface module while using touch-sensitive screen technologies or any other conventional data entry means including voice commands. Requests for seating can also be forwarded to the map/monitor via preferred seating information stored in the visitor card. After the selection is made, the map will display the price of the ticket while requesting adequate payment. After payment is provided by the visitor and received by the admission center, the selection is confirmed and loaded into the visitor card as an electronic ticket. The appropriate seat assignment(s) is now conveyed by the seating map as being sold; the seats cannot be selected by somebody else.

The seat assignments are also communicated in real-time to any other admission center or remote ticket sales office that is authorized to sell tickets for the same event. The instantly available seating information across a network of admission centers and ticket offices also facilitates the purchase of tickets from other remote locations. For example, the cardholder can access, from home, the database containing seat assignments via the visitor card and/or a computer terminal, select and pay for the seat locations, and load the selections made into the visitor card as the corresponding ticket. This electronic ticket now allows admission to the event.

The card slot (102) allows the visitor to insert and retrieve the visitor card for the purpose of loading the selected seat assignments into the card, displaying and manipulating card data, as well as updating the card contents. The card slot (103) provides the visitor with a new card in response to the compilation of a blank card or to the selection of a predefined card type provided by the admission center. This slot can also print-out a label or provide a sticker showing the selected seat assignments for the corresponding event; the label/sticker can be affixed onto the visitor card, attached to on any other media, or used as is. The new card can be compiled, including displayed via the user interface module onto the screen, or selected via the card tray (105) that contains a plurality of card types. To compile or select a new visitor card, the visitor (cardholder) also has the option to choose from various text, logos, artworks, or audio and video files provided by the center. The compiled information/options can be loaded into or imprinted onto the visitor card.

The banking module (106) allows the visitor to pay for the tickets (i.e. seat assignments) or for the new visitor cards, as well as to load a monetary value including electronic payment points into the visitor card. To purchase the tickets/cards the visitors can select appropriate payment means from among a set of options (107) including cash, checks, ATM (Automated Teller Machine) cards, credit/debit banking cards, or the visitor card per se. The banking module verifies the received payment data and related information for the purpose of authorizing and settling the appropriate payment options. This verification and clearing process can be accomplished via a network transaction processor by communicating with the banking module to settle the appropriate fund transfers, or via the visitor card by deducting the monetary value or payment points previously stored in the card. The slot (108) accepts the credit/debit card, check, visitor card or any other media representing a particular money equivalent, so as to capture the information recorded/imprinted onto such media. The captured information will be used in conjunction with the payment data for the implementation of the selected payment option. This information can also be digitized and stored in the visitor card as an electronic representation of that information. For instance, the banking module facilitates the storing in the visitor card of electronic payment forms, which represent traditional paper/plastic-based bank cards, together with digital money allocated thereto. Electronic payment points, which represent use or consumption rights underwritten by a non-banking entity, can also be loaded into the visitor card. For example, the event organizer provides the visitor, in exchange for adequate payment, a set of payment points that can be used for the purchase of goods and services at any merchant location accepting those points. After acceptance, the payment points can be redeemed by the event organizer; the merchant can exchange the points for traditional money.

The module (109) serves as a two-way communication link for the purpose of exchanging audio, video, or any other data and information between the visitor and the entity that services and maintains the admission center. For example, this capability can be used to report issues observed or problems encountered by a visitor engaged into a dialogue with the admission center.

The access control modules (111) and (112) facilitate the admission to and the exit from the premises where the event takes place. Both control modules also monitor and gather marketing data about visitors entering or exiting the premises, compute the actual number of visitors attending the event, as well as compile the availability of open seats. This marketing and attendance data is then forwarded to the admission center and other system entities. The modules can also scan visitor ID (Identification) documents for the purpose of retrieving and evaluating selected information recorded onto such documents. For example, the DOB (Date Of Birth) data or picture can be captured from a valid driver's license to determine the age and physical appearance of the visitor presenting the license. The card slots (111.1) and (112.1) allow the visitor to insert and retrieve the visitor card including to couple to the access control modules, so as to permit the control modules to read the card data including the electronic ticket stored in the card. This card-based ticket information can also be projected onto a display panel that communicates with the control modules.

If the visitor card is authentic and contains the appropriate admission rights, the control modules allow the passage through the gate the modules are installed at; otherwise deny the passage and signal the unauthorized attempt. For example, if the electronic ticket stored in the card contains a valid seat assignment with the correct time, date, location and name of the event, then the mechanical arm of the control module permits the visitor to enter or exit the premisses; otherwise passage is blocked through the gate. If approved for passage, an appropriate admission, or exit, stamp will be loaded into the visitor card. These stamps are tamper proof and can be stored only by the control module while containing the time-stamped information relating to the tickets. The admission stamp identifying the cardholder as being lawfully admitted to the event via the card-based ticket, can therefore prohibit admission of more than one visitor with the same seat assignment while preventing the embarrassment and anxiety associated with a multiple-ticketing situation. The admission stamp also voids the ticket, so as to inhibit the fraudulent use of the same ticket for multiple admissions; for example, to prohibit the compilation of more than one admission stamp based upon the same valid. This stamp can be further used to qualify the visitor for privileges associated therewith; for example, to receive a free gift for being the one thousands visitor attending that event. The admission stamp is valid only for that particular event and cannot be used in lieu of a ticket; for example, it is valid for a predetermined time period but will be automatically erased after the event concludes. As a function of the admission policy, the admission stamp can also be erased whenever a visitor leaves the event, unless the card is presented for the purpose of re-entry to the control module at the exit gate.

When a visitor wants to temporarily exit the premises where the event takes place, but return to the same event or premises without having to pay another admission fee, the visitor card has to be inserted into the control module at the exit gate. The control module verifies the card-based admission stamp and if present and valid, compiles a corresponding exit stamp comprising the time and location of exit, and stores the exit stamp in the visitor card. The visitor removes the card and leaves the premises. When presented at the entrance gate within a reasonable time period, the control module verifies the exit stamp, including the time of exit, and if valid, allows the visitor to re-enter for "free;" assuming there is a valid admission stamp stored in the card as well. The control module can also verify the admission stamp and update it with the time of re-entry, or regenerate a new admission stamp if it was erased by the exit stamp. If a card is presented for re-entry with only an admission stamp stored therein, but without an exit stamp free admission will not be allowed. This will prevent the use of the same card-based ticket by more than one visitor. There is an exception in the case of visitor biometrics being included in the admission stamp. For example, when compiling the initial admission stamp, the control module can also capture and store the visitor's fingerprints in the visitor card. When presented for re-entry, the admission stamp will request the matching fingerprints before granting passage without having to pay an admission fee; only the visitor previously approved for admission can provide the identical fingerprints.

The biometrics modules (111.2) and (112.2) at the entrance and exit gate serve as an additional security means for controlling the visitor flow and safeguarding the visitor cards. These two modules can be used to capture visitor biometrics characteristics, such as fingerprints or voice imprints, and compare the captured data with biometrics information previously stored in the visitor card. The captured biometrics can also be loaded into the card or admission database. For example, a season pass holder might want to protect a season ticket, which is hosted via the visitor card, with a particular biometrics. When presented at the entrance gate, the control module requests confirmation and the cardholder must provide the identical biometrics to unlock the ticket; otherwise the card-based ticket cannot be retrieved nor displayed, and no admission is allowed. Or a ticket holder leaving the premises before the event is over, might want to capture and temporarily store a particular biometrics in the visitor card to make sure nobody else can use the card for re-entry purposes. When the visitor card is presented at the entrance gate, the matching "live" biometrics must be provided in addition to the exit stamp to have admission granted; otherwise re-entry is denied. In addition, these modules can also provide the input means for scanning the physical appearance of a visitor and for communicating it to the control module; the visitor's appearance can then be compared against the photo scanned from an ID document or stored in the visitor card. To further safeguard the use of biometrics information, the biometrics modules at the entrance gate to the event can be used only by visitors arriving for admission, and the biometrics module at the exit gate only by visitors leaving the event.

The admission center can be implemented not only as a physical gatekeeper to the premises where the event takes place, but also as a virtual gate to the event per se. For example, the visitor card can facilitate the viewing of events from remote locations, such as from a residence with a TV set or with other on-line communication means, as well as allow payment for the use rights or services consumed thereby.

Figure 3:
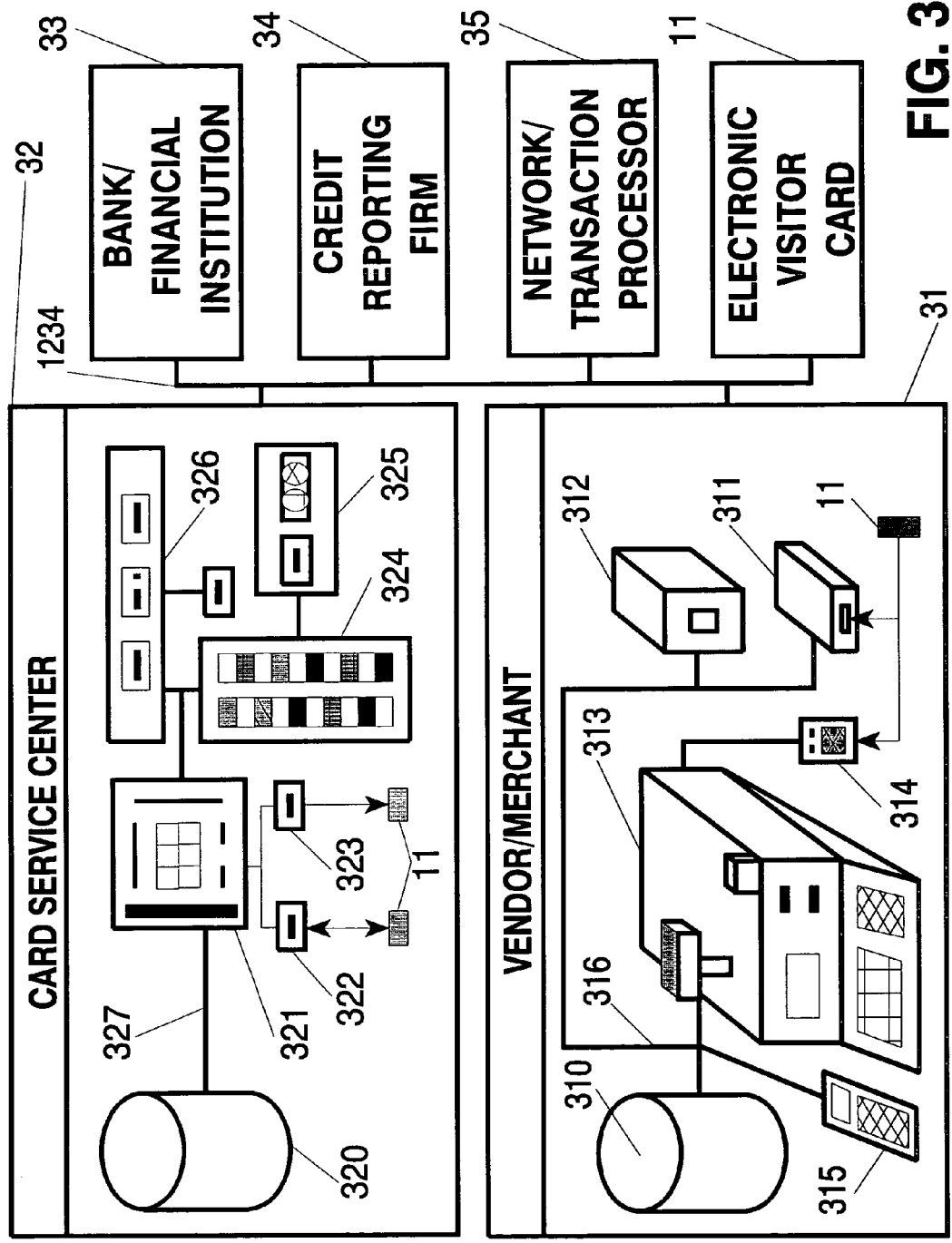
FIG. 3 is a block diagram illustrating one embodiment of an electronic access system including the plurality of service providers and the functional components of a merchant location and card service center; as well as the communication links between and among the system entities and visitor card per se.

FIG. 3 depicts the plurality of service entities that provide merchandise to the visitors, render various services, and facilitate the support functions needed for the delivery of such products and services. The Vendor/Merchant (31) provides a plurality of goods and services the visitors can purchase via traditional payment means or via the monetary value, including electronic cash or payment points, stored in the visitor card. The Card Service Center (32) renders a plurality of card services, such as the loading of specific entitlements into an issued visitor card, or the selection and compilation of a new card configuration. The Bank/Financial Institution (33) represents the entity that facilitates a plurality of payment options for the cardholders and merchants, as well as the exchange of electronic debit/credit payment data between the appropriate entities. The Credit Reporting Firm (34) represents a credit bureau that compiles and maintains the credit reports of individuals and corporate entities, as well as approves/declines payments via various risk-management services. The Network/Transaction Processor (35) provides the infrastructure and services required for the processing of payments and transfer of electronic funds, including for the clearing and settlement of electronic transactions and related information. The Electronic Visitor Card (11) is the portable card used by the visitors when attending an event or buying goods and services.

The VENDOR/MERCHANT represents the location visitors can purchase goods and services via the electronic visitor card (11). The electronic payments received from the visitors can be credited to the merchant's account as digital cash, as well as converted back into traditional money or credit (e.g. interchanged with traditional currency or conventional credit lines). The means employed to accept the visitor card for payment, including to exchange data and information between the card and the merchant, to verify the card's authenticity and to update the card contents or the system database, comprise: a database scheme (310), card read/write device (311), biometrics box (312), POS (Point Of Sale) terminal (313) with a PIN (Personal Identification Number) tablet (314), portable terminal (315), and various software programs. These system components are connected via a local communication link (316) to allow the exchange of data/information throughout the merchant entity. These local components, including the merchant per se, are also connected via the global communication link (1234) to the other system entities for remote data exchange.

The database scheme stores the data and information relating to the vendor and its customers including visitors, services and products provided, and to the transactions performed between the vendor and the visitors. The database data includes, for example, the name, mailing/business address, telephone number, and other data about the vendor and the customers. The information also comprises a unique vendor identification number, account numbers with financial institutions, security keys and access codes used for cryptographic purposes and protection schemes, customer lists and negative files including cancelled or fraudulent account numbers, and various validation codes. These latter codes are associated with the goods and services provided by the vendor for proof of products/services being rendered, and for authentication of products/services being returned by the visitors for exchange or for money-back purposes. Also included is information relating to payment transactions, such as details about the service or merchandise purchased with the visitor card, electronic receipts for the cleared payments, the visitor's purchase habits, and the customer's payment history.

The card read/write device can read the visitor card's contents as well as write information into the card. Such a device can be implemented as a stand-alone unit, a built-in fixture being part of computer terminals and other control devices, or as an interface port integrated within networking platforms. This read/write information can be exchanged with the visitor card via contact or contactless means, as well as displayed and manipulated within the visitor card or onto the POS display. When communicating with the visitor card, the card reader can also locate, retrieve, and display the amount of monetary value, including payment points or frequent shopper points, left in the card.

The biometrics box includes means for capturing the biometrics characteristics, such as fingerprints, voice, facial appearance or eye characteristics, of a particular cardholder. The captured biometrics can be stored into or imprinted onto the visitor card and/or loaded into a remote database. This biometrics can also be compared with biometrics information previously stored in the visitor card or in a remote database, to verify if a cardholder is legitimate.

The POS terminal performs the cash register functions and triggers the transaction processing for purchases made with the visitor card, while communicating with the card via the PIN pad or the card reader device and with the payment clearing house via the global data link. Instead of the POS terminal, a PC or any other computer terminal can be used as well. For a particular purchase, the POS terminal will accept the monetary value stored in the visitor card as electronic payment cash or payment points. The purchase amount, including traditional payments simulated by the card, will be therefore authorized and processed automatically via the card's electronic means without having to communicate with a central computer for on-line authorization/approval purposes. Once received by the vendor, the card payment can be cleared by the reconciliation entities as electronic cash or as the corresponding traditional payment carrier. In this way, traditional paper or plastic-based payments can be initiated and settled via computerized means provided by the multi-service visitor card, as compared to traditional payment systems implemented via manual or semi-automated operations facilitated by a variety of single-payment carriers. The POS terminal can operate stand-alone or networked including with client/server settings. If applicable, security keys and access codes can be used to authenticate the payment data and related information, as well as to verify the cardholder. For example, payment forms earmarked with the security key of the bank and of the visitor, can be authenticated and unlocked by inputting the corresponding keys. Cardholders or visitor card data protected via unique identification or predefined authorization schemes can be identified or used by providing the appropriate information.

The portable terminal can be any handheld computer device used for the exchange of data and information with the visitor card, as well as with the remote system databases including the merchant database. The communications means used to exchange such data/information can be implemented via any commercially available wired or wireless technology. For example, mobile vendors using such a portable terminal while selling fast food items and other goods to visitors attending a sporting event, insert the card into the terminal, verify and deduct the appropriate electronic payment, and store the captured payment data in the portable terminal. The portable terminal can also communicate the transaction information including the payment data with the merchant database, so that mobile vendors can be reimbursed. These portable terminals can also interface with a plurality of prepaid payment cards that contain a predefined monetary value; the terminals deduct payments from or reload the value stored in the card.

To solve the issue of having the visitor pass money or to leave the seat for providing payment to the vendor, which is pretty annoying for other visitors who are watching the sporting event, the invention provides an alternative solution: the use of a multi-directional data communication link containing means for coupling to the visitor card from every seat and for communicating with the portable terminal throughout the stadium; as well as means for inputting, displaying, and approving a particular payment amount. This data link can be implemented via wireless means, such as a cellular telephony system technology, or installed under all seats (e.g. benches or chairs) containing means for inserting the visitor card from every seat. In the former case, the portable terminal can communicate directly with the visitor card. In the latter case, the communication link is also accessible at the end of every row, so that mobile vendors can connect their portable terminals thereto to communicate with the visitor cards accordingly. The visitor can select a particular item, approve the appropriate payment, and forward the payment data to the mobile vendor via the visitor card or perform those functions via a panel installed at the seat. This panel comprises the input/output means allowing to display and select a particular item, enter payment amounts, and forward the purchase request onto the communication link. When the visitor card and/or panel forwards a purchase request onto the communication link, an appropriate electronic signature will be included into the request. This signature identifies the particular seat or visitor requesting a specific item, as well as the payment provided. In response to the purchase request, the portable terminal will compile and return onto the data communication link an electronic receipt that confirms receipt of the payment while representing the vendor's commitment to deliver that particular item. The electronic receipt and signature will be stored in the portable terminal and visitor card as a "who paid-how much-for what-at what time" proof. This proof comes in handy when disputes arise, including when visitors exchange electronic money, payment points, or any other entitlement between each other by using a card-to-card transfer means. The mobile vendor can now hand that item to the visitor, as well as print-out a label, which shows the seat assignment the item should be delivered to, and affix the label to the purchased item. At the same time, the mobile vendor can also forward the electronic payment received from the visitors to the merchant database or financial institution, as well as to the event organizer underwriting the payment points. To make sure that the electronic money or points will be deposited only to the vendor's account, the vendor can attach a security key to the forwarded payment information. In this way, the electronic payment can be unlocked and used only by the legitimate vendor providing the correct security key.

The CARD SERVICE CENTER provides the computerized means, including distributed database storage means, for loading into the visitor card various entitlements that qualify the cardholder for a specific service, right, or consideration. This center also allows the visitor to display the card contents, reload the monetary value/payment points stored in the visitor card, select and purchase predefined card configurations, and communicate with the system entities. Such service centers can be deployed throughout the premises where the event takes place or at remote locations; the centers can also be accessed via the global data communication link.

The database (320) stores the data and information needed by the card service center to perform the operational tasks including data communications and security management. Such tasks comprise the storing and retrieving of card data, exchanging information between the visitor card and the system entities, and protecting the card data and information communicated among and between the system entities. The database will also store an audit trail concerning the system's operations and the card's usage. This audit trail establishes the concept of non-repudiation with the help of a "who did what-when-where" recording; the recording is tamper-proof and non-erasable.

The database data comprises the identification number, security keys, and validation codes of the service center. The identification number includes the location/address and business affiliation of the center. This unique identifier can also be used to certify a specific card data, so as to proof the authenticity of that data. The security keys and access codes are used to scramble information and to protect access to data. The validation codes are associated with the entitlement data loaded into the visitor card, so as to proof the authenticity of the entitlements when presented by the visitor later on for consumption or trade-ins. The database further comprises the identification numbers of the event organizer and the service providers; visitor lists including the cardholder identification number, demographics data, and attendance record of the visitors; negative files/hot lists with invalid account numbers or visitors with past payment problems; card authenticity files corresponding to the card authenticity codes or identification numbers stored in the visitor cards; software card templates for the various card configurations; as well as information certified for exchange with other entities. Also included is information about the terms and conditions relating to card service options available to the visitors, entitlements stored in the visitor cards, and to service transactions performed via the visitor card. This latter transaction audit trail may include details about the services rendered, card products purchased, and the visitor's purchase habits.

The user interface module (321) allows the visitor to interact with the card service center while instructing the center, and system components linked thereto, to execute the arithmetic and logical functions required to compile the visitor card contents and to implement the related computational, storage, and communications tasks. To select the instructions and to input data, various input means—such as a keyboard, pointing device, or voice commands—can be used. This module also displays via a display screen/monitor data inputted or retrieved by the visitor, as well as information and feedback provided by the system entities.

The card slot (322) allows the visitor to insert and remove the visitor card for the purpose of loading data into the card, as well as retrieving, displaying and manipulating the card data. The stored card data can be selected on the monitor from among a menu of available service benefits, such as new seat assignments, additional monetary values, or related information. The card slot (323) provides the visitor with a new card in response to the compilation of a blank card or to the selection of a predefined card type. This slot also can print-out, for example, a label/receipt with the selected information or provide a sticker showing the selected seat assignments for a particular event; the label/sticker can be affixed onto the visitor card or attached to any other media. The new card configurations can be compiled on the monitor and/or selected from the tray (324) that contains a plurality of card types including text, logos, audio and video data files, and artworks to choose from; these options/configurations can be loaded into as well as imprinted onto the card via the above card slot.

The multimedia module (325) establishes a bi-directional data communications link between the visitor and service center for the purpose of exchanging data, text, graphics, audio and video information; as well as for capturing and forwarding such data and information throughout the system. This module can, for example, capture and verify biometrics characteristics of a cardholder, or facilitate an interactive dialogue between the visitor and system administrator.

The banking module (326) allows the visitor to pay for the service benefits requested and loaded into the card, as well as for the new visitor cards. The visitors can select appropriate payment means from among a set of options including cash, checks, ATM or credit/debit banking cards, as well as the visitor card per se. The banking module verifies the received payment data and related information for the purpose of authorizing and settling the appropriate payment options. This verification and clearing process can be accomplished via the visitor card by deducting the monetary value (e.g. electronic cash or payment points) stored in the card, or via a network transaction processor by communicating with the banking module. The banking module also facilitates the loading of electronic payment forms including digital cash or payment points into the visitor card; the stored electronic forms, cash, or points can be used to pay for the benefits loaded into the card or for other purchases of goods and services. The cards or any other media representing a particular money equivalent, will be inserted into the banking module, so as to capture the information recorded or imprinted onto such media. This captured payment information will be used in conjunction with the selected payment means, as well as digitized and stored or reloaded into the visitor card as a monetary value to be used for electronic payments.

The card service center's components are connected via a data communication link (327) to a local area network, as well via the global communication link to the remote system components including the service providers and admission center.

FIG. 4 illustrates the functional structure including the electronic card template of the multi-service visitor card, which facilitates the card's computerized means for compiling the card contents and for communicating data and information between and among the remote databases including the portable visitor card. The means includes the capturing, inputting, storing, retrieving, displaying, evaluating, computing, processing, and exchanging of the data/information needed for the card's usage and the system's operation. The card contents can also be manipulated, displayed, and exchanged via commercially available computer terminals, such as personal computers, POS terminals, or automated data collection and inputting devices. To safeguard the card contents and protect the data exchange, the card issuer, system entities or cardholder can load authenticity data and security information into the visitor card. To allow the communication between proprietary platforms, the card data and database information can be automatically translated or converted from a particular data format and contents into data/information with another format and contents. The visitor card comprises a plurality of fields, distributed between and among the card and/or system components, to facilitate the card-based functions and operational tasks of the system:

The BUTTON fields trigger and facilitate the storage, processing, and decision logic means required for the implementation of arithmetic and logic operations, as well as of the communications management functions. Such means retrieve and display, for example, the card data, edit the data, and store the edited data in the card or communicate it to the remote databases. Such means further processes monetary values stored in the card for the payment of goods and services, computes the required payments and the remaining card balances, attaches a time stamp to the computations, and communicates the results with the card and databases. Such means further checks the validity and expiration dates of the benefits data stored in the card, verifies the authenticity of the card data, and determines if a visitor card should be approved or denied for admission to an event or for other services. When selected, these buttons display a set of pop-up or pull-down menus that aid the user in understanding and implementing the card's operation.

The CARDHOLDER/VISITOR BACKGROUND field comprises data and information, which relate to the visitor and the framework the visitor card can be used within, as well as an instruction-window, which provides and displays a set of help-functions to guide the cardholder through the steps of compiling and using the card data. The stored information includes, for example, the visitors's demographics data such as name, address, birth date, and telephone number; cardholder identification (ID) information such as a visitor ID number, SSN (Social Security Number), or check guarantee number; and an electronic representation of cardholder documents such as a visitor pass, driver's license or identity card. Also stored are the overall terms and conditions the visitor card has to conform to when being used, data and information about the card's eligibility for a particular event or service, card usage including services rendered and events attended via the visitor card, and the visitor's credit history including approvals or declines of card-based payment transactions or fund transfers. The stored background data elements comprise plain data that can be displayed and modified by all system users, restricted information that can be accessed or manipulated only by an authorized entity or by the cardholder, and certified data that can be retrieved and viewed but changed only by the certification center.

The TICKET/PAYMENT OPTIONS field provides a plurality of ticket and payment options that can be selected or implemented via the visitor card, as well as the status relating to a particular event and a specific payment form. The stored forms can also be used to implement loyalty programs that let cardholders earn frequent shopper points for purchases initiated at a particular merchant. The points, which will be stored in the visitor card, have value similar to cash and can be redeemed by initiating future purchases with the visitor card at that merchant. An INSTRUCTION & SEAT SELECTION window, incorporated into this field, guides the card user through the steps of selecting and using those options and of inputting and computing the status of the ticket-related information and payment account data. This window provides and displays instructions that describe the choices available for a particular task, recommendations about how to proceed, and the outcomes associated with a particular task or recommendation. The window also explains the outcomes associated with a particular command or function being executed. This window can further display the selected tickets and payment forms with detailed information relating thereto. The options field comprises the selection and status sections.

The SELECTION EVENT/FORM section comprises the electronic representation of tickets for a particular event and of monetary values for a particular payment form, as well as communication links for other card data and database information. The Selection Event/Form section allows the selection of electronic tickets and payment forms stored in, including to be loaded into, the visitor card. Tickets for a particular event can be identified via a ticket number and payment forms for a particular purchase via a name or account number. The electronic tickets comprise the name, location, and date of the event including the related seat assignments. The tickets can be stored for admission to a single event or as a season pass for multiple events. A visitor card can host a ticket for a single visitor or a set of tickets for a plurality of visitors. The electronic payment forms comprise payment options that represent currencies or other traditional paper/plastic-based banking cards via an electronic monetary value stored in the visitor card. The payment forms can also comprise promissory notes endorsed by the event organizer and accepted by the service providers for the purchase of goods and services; such type of notes represent electronic payment points that will be settled by the organizer the way commercial banks clear payments made via their paper/plastic cards. This section can also store a set of benefits data that entitle the visitor to specific rights, services, or considerations. Such benefits may include a right to repeatedly enter and exit the premises the event takes place while presenting the electronic visitor card to the automated control gate, the accumulation of bonus points or electronic coupons for repeated attendance or frequent purchases, the redemption of those points or coupons later on by the event organizer or service providers, or a free ticket for a future event in exchange for hours worked as a volunteer for the event organizer. The data and information relating to the tickets, payment forms, and benefits data can also be earmarked electronically (e.g. with identification numbers or security keys) by the underwriter of the card data, so that authentic data/information will be forwarded securely to the recipient. Such a recipient can comprise any of the service providers including the event organizer or holder of the visitor card per se. A particular card data can also be protected via the recipient's security/identification key (e.g. attached to the data), to allow use of the communicated card data only by the entity intended to receive the data. For example, a bank attaches its identification key to a credit card payment form and encrypts the form with its security key. To make sure that only a particular cardholder can use the payment form, the bank might also capture the visitor's biometrics information or security key and attach the captured information or the inputted key to the payment form; to unlock the card-based payment form, the identical biometrics of correct key has to be provided. The visitor, when paying a merchant via the form, might also attach the merchant's identification number or security key to the payment forwarded; in this way, only the merchant that can provide the matching number or correct key, can clear the payment.

The STATUS TICKET/ACCOUNT section comprises information about a particular ticket including the ticket number, or a payment form including the account number, that is available for implementation via the visitor card. Also included is information about applicable copyright statements or any other disclaimer notices with regards to the tickets/forms. The ticket information shows, for example, the contents of the electronic ticket comprising the date, name and location of the event the ticket relates to; the seat assignment the ticket holder is entitled to; and the price of the ticket. This status information corresponds to the seat selections made on the seating map: the same seat assignment compiled via the seating map will be displayed onto the visitor card template, as well as a particular seat assignment inputted into the visitor card will be communicated to the seating map to update the available seats accordingly. In other words, specific seating data stored in the card can be displayed off-line, but changed only if the card is in on-line communication with the seating map; only this map has the authority to make the final ticket reservation including accepting new seating requests or changing previously made seat reservations. The account information shows, for example, the maximum amount associated with a selected payment form, as well as the total amount spent so far (total spending), the funds (remaining balance) available via the card, and the purchase amount (payment due) that is needed to pay for a particular service or merchandise including a ticket. If the remaining balance is equal to or greater than the due payment, the card-based payment form can be used to pay for the merchandise. When approved by the cardholder, the payment amount will be added to the total spending amount which reduces the remaining balance accordingly; the total spending amount is deducted from the maximum amount to yield the remaining balance. If the payment due is more than the remaining balance, the selected payment form cannot be used for payment; the remaining balance has to be augmented. The remaining balance can be increased by reducing the total spending amount and/or by increasing the maximum amount associated with the payment form. This can be achieved, for example, by the cardholder paying off at least a portion of the balance owed to a bank and by the bank, reducing in response thereto, the total spending amount accumulated in the card. Or the bank can increase the credit/debit limit for the selected payment form, and store the higher maximum amount into the visitor card to recharge the depleted amounts. The cardholder can also augment the remaining balance by transferring a monetary value from another payment form, or downloading additional payment points, to increase the maximum amount or lower the total spending amount stored in the card.

The ACCESS CONTROL field can verify the legitimacy of the cardholder, validate the visitor card, and protect access to certain information. This data field comprises PIN/biometrics information or cryptographic keys/digital signatures to confirm the legitimate cardholder, authenticity codes to validate the card per se, and authorization levels with access codes to safeguard data stored in the card. If for example, a PIN/biometrics information stored in the card matches the PIN/biometrics characteristics captured from the cardholder, the cardholder is legitimate. If for example, an authenticity code stored in the card matches authenticity data stored, including provided, by the system entity the card tries to communicate with, the card is valid. If there is no match, or such security data/information is not stored in the card although it should be, the cardholder is not legitimate and/or the card is not authentic; in this case, no data/information can be communicated with the card, including no payment data loaded into or used via the visitor card. This field also monitors and controls access to the other card fields via appropriate access codes that correspond to a set of predetermined authorization levels. In other words, entities attempting to access (read) or manipulate (write) a particular data field or card element, must be authorized to read data from or to write data into the card's data fields. Such an authorization may encompass the certification of the identification number or security keys of the entities, which want to read/write the card data, with the appropriate access codes to yield appropriate access rights for those entities. Certain data stored, for example, in the "Cardholder/Visitor Background" field will be protected against alteration by unauthorized entities: the DMV (Department of Motor Vehicles) or Social Security office can communicate and update the driver's license number or SSN and related information, but the cardholder or merchant only look at it or copy and download it as is. The "Ticket/Payment Options" field will be safeguarded, for example, by denying the selection and usage of tickets or payment forms without proper authorization: cardholders can access and unlock an authentic electronic ticket or payment form via the cardholder's identification number or security key and/or by the security key or identification number of the entity that endorses the ticket selection or payment form.

The CERTIFICATION field allows the certification of information stored in the card by an entity such as the event organizer, service providers, or the cardholder per se. The card data can be certified via a security key or any other unique certification code that confirms the identify of the certifying entity and thus authenticates the card data. The resulting certification stamp will be attached to the card data as a tamper proof certificate. This field also allows the storage of a digital certificate in the visitor card per se. The certificate can be exchanged automatically with an entity's certificate stored in a system database. Based upon this, the certificates allows, for example, each party in a transaction to confirm the identity of the other. If scrambled with an appropriate key or code, the certificate can be unscrambled only with the matching key or code or the proper information correlating thereto. In the above context, cardholder benefits data or entitlement information can be certified by the entity underwriting and backing such information. For example, an electronic season pass can be certified by the event organizer, or an electronic coupon validated by the merchant. When presented for use or communication, the pass/coupon can be established via the card-based certificate as being authentic. If confirmed to be authentic, admission or consumption will be approved as well; otherwise, no service will be rendered. In addition, the age of the visitor can be verified and the confirmation loaded into the card; as proof that the visitor is at least 18/21 years old and therefore entitled to purchase alcoholic beverages offered during the event. The certified information can also relate to the cardholder's identity, such as social security number, driver's license, or the PIN of the visitor.

The SECURITY field comprises the means to further safeguard payment card data and to facilitate a secure communications exchange throughout the card and between the card and the system entities. This field allows the compilation and employment of security keys to be incorporated into access codes protecting data or attached to information communicated between and among the system components. Certain information/card data elements can be, for example, encrypted via a cryptographic key by the sender before being communicated to a particular entity, and decrypted via a cryptographic key only by the entity authorized to receive the data/message. The encoding/decoding functions allow the related translation/conversion of information with respect to different data formats and different data contents; for example, from analog to digital or from one computer language to another, and from an information item containing a particular number of data elements to a similar item but with a different number of elements. The instruction-window provides additional details and instructions about how to compile, select, and use the card's security features.

The AUDIT TRAIL field stores a trail concerning the card's usage, including what data/information was loaded into the card and exchanged with the other system entities. A typical trail comprises the date and the location the card was used at, a description of the service provided or of the activity performed, and additional comments and explanations relating to the service or activity. This field also gathers marketing data about the visitor's attendance record and purchase patterns including the number and type of events visited and goods or services purchased, as well as where, when and what payment form was used to pay for the goods and services. This marketing data is then forwarded to the appropriate system entities, including the event organizer and selected service providers for analysis.

The invention also includes a method of compiling the contents of the visitor card and of issuing the card to a legitimate cardholder; the card contents comprising a set of data elements that are also stored and maintained throughout the remote system databases. The method includes the steps of verifying the identity of the cardholder, storing cardholder data and system entity information in the card, selecting and loading electronic tickets into the card, storing payment information and monetary values in the card, loading other visitor entitlements into the card, authenticating data and information stored in the card, protecting access to card data, issuing the card to the legitimate cardholder, and establishing an appropriate audit trail.

The verification of the cardholder can be accomplished by checking conventional ID documents presented by the cardholder, verifying cardholder-related information stored in Government or public databases, or by providing security information that has to correspond to the security data stored in the card. If the verification process is successful, the cardholder is authorized to retrieve, manipulate, and store card data and related information; as well as use the visitor card for the rights stored in the card. Admission to events by ticket holders, security personnel, or by licensed merchants, are such rights. The card's authenticity can also be verified by checking the card authenticity code stored in the visitor card, including by comparing the code against the authenticity file stored in the system database. If the code is valid including if there is a match, the visitor card can be used; otherwise, card service is denied.

The data and information relating to the cardholder or system entities will be loaded into the visitor card via the card's computerized input/output means including the card data templates or via a computer terminal including the read/write device and biometrics box. The cardholder data comprises demographics data, such as a visitor ID number or SSN, and security information, such as a PIN, biometrics characteristics, or cryptographic keys. Cardholder data can also include an admission permit for security and administrative personnel, as well as a license for merchants authorized to sell goods and services during the event; the permit or license can be used in lieu of a ticket to gain admission to the event. System information comprises data, such as identification numbers and security keys, about the entities that interact and communicate with a visitor card. The card data can be inputted by a card user while being provided by the cardholder or captured from a media holding information to be stored in the card. The card data can also be downloaded from other system databases including transferred from another visitor card.

The card-based tickets will be stored as an electronic representation of the seat assignments, which guarantee admission to an event, while acting as an admission pass to that event upon presentation by the visitor. The admission can be of a physical nature via entrance to a sports stadium, or a virtual passage via a remote data communication link. The specific seat including name and date of the event will be selected from the seating map, which coordinates all seat assignments, and loaded into the visitor card. The card-based seating data and related ticket information is tamper proof and can be retrieved only from this map, including downloaded from any authorized ticket-issuer. The seat assignments stored in a particular card can nevertheless also be transferred into another visitor card without the need to communicate with the seating map: once transferred, the original seat assignments will be automatically cancelled in that particular card, so that no more than one valid ticket can be in circulation. The selected seat assignments and related information can be displayed, checked for accuracy, or cancelled including replaced with new assignments and different data.

To pay for the tickets or the goods and services purchased by the visitor, an appropriate monetary value will be loaded into the visitor card. This value can be an electronic representation of traditional money including paper/plastic-based payment forms endorsed by banks, as well as electronic payment points underwritten by non-financial institutions including the event organizer. The information encoded on the banking payment forms can be scanned and digitized by a payment reader coupled to the visitor card, or downloaded from the bank's database via the data communication link. The scanned or downloaded information is then stored in the visitor card as an electronic payment form with a monetary value associated thereto. The payment points, which are sold or provided to the visitor by the event organizer, can be loaded into the card via the card read/write device or via the data communication link directly from the organizer's database. The stored payment forms and related monetary values can also be displayed onto the card template, verified and updated, if necessary.

Besides admission rights, a set of other rights, services or considerations can be compiled and loaded into the visitor card as well. This set of data allows the visitor to trigger or to receive the stored entitlements upon presentation of the visitor card. The specific entitlements can be automatically loaded into the card during usage or selected from among a menu of benefits offered to the cardholder by the event organizer or service providers. For example, when entering and leaving the same event, the admission and exit stamp, which are automatically loaded into the card, allow the re-entry of the visitor without having to pay any additional fee. By purchasing a certain amount of merchandise, or by consuming a predefined level of services, an appropriate number of bonus points will be stored in the card; further stored in the card can also be parking or telephone points. These points can be exchanged later on for a reduced purchase price, applied as a co-payment for parking, or used to place a discounted phone call. As consideration for an endowment, the event organizer can load, for example, a free ticket into the card of the visitor making the endowment. Also loaded into the card can be—after verifying the age of the cardholder—an appropriate permit to buy alcoholic beverages during the event.

To ensure the authenticity and integrity of card data, a set of related information is stored in the card and/or databases: authenticity codes to verify the visitor cards, validation codes to electronically earmark goods and services including visitor entitlements, identification numbers and certificates/digital signatures to authenticate the stored card data or information being communicated, and security keys to guarantee the data's integrity. This set of information, which is associated with the card including card data needing authentication, is tamper proof and can be loaded into the card only by the entity responsible to authenticate the data. If this information is scrambled including protected, it can be unlocked only by the authorized entity including proper keys or access codes. After successful unlocking, the authenticated card data will be retrieved from the visitor card, or downloaded from a database, and displayed onto the visitor card or computer terminal as legible data. For example, the DOB of a visitor certified by the DMV office and unlocked via the DMV's security key or the visitors biometrics, can be displayed or downloaded as "California Driver License, X1234567, <Name>, DOB: mm-dd-yyyy, Certification #/Digital Signature: 123ABC4D5E" statement.

To protect selected access to the visitor card, the cardholder or any other system entity can employ various protection schemes to safeguard the individual card data elements. For example, cardholders can input their PIN or biometrics information into the visitor card, as well as scramble certain card data with appropriate security keys. System entities can, for example, control access to card data via predefined access codes or various security keys. Copyright statements and other notices can also be stored as a deterrent to illegal activities. To gain access to the card data, the appropriate codes or keys have to be provided by the entity attempting to do so. The provided information has to match, or correlate to, the one stored in the card. The same methodology applies to data that is protected and stored in a database; authorization to retrieve including download the database data is granted once the proper access information is provided.

Once the card contents is compiled, the card including data modified and stored therein can be used by the visitor authorized to do so. The card will be issued to cardholders that have provided adequate payment including information identifying the cardholders and data validating the access rights. The issued cards can be used by one cardholder or by any other cardholder who is also authorized to access and use the card data. For example, a group of sports fans having all of their tickets stored in a visitor card can use the same card for admission to the sports stadium.

The system databases including the visitor card will also store an audit trail about the card's usage including the editing of card data and the communication of information between and among the remote databases and the visitor card.

The invention further includes a method for admitting the cardholder to a particular event via the electronic ticket and related admission rights stored in the visitor card. The method comprises the steps of verifying the card's authenticity, determining if the card-based ticket is valid, compiling and loading an admission stamp into the card, deciding if more information should be loaded into the card, implementing admission to the event, and establishing an audit trail.

Upon presentation at the entrance gate for admittance to the event, the visitor card will be verified by the control module while comparing the authenticity code stored in the card against the authenticity file stored in the system database. If there is a discrepancy, the card will be retained and an appropriate warning message conveyed. If there is a match, the card is authentic and approved for further service including to be used as an electronic ticket, or an admission pass for security personnel, administrative staff, and licensed merchants.

The validity of the electronic ticket stored in the card will be determined by reading and verifying the related information including the seat assignment, time, location, and name of the event. If there is an irregularity, such as an invalid seating, obsolete date, wrong location, or different event, the admission center will convey an appropriate warning message; no passage is allowed. If the verification is successful, the ticket price will be analyzed to see if it is lower than the regular rate charged at that time; children or seniors are entitled to a lower price. If a regular price was paid by the visitor, the visitor may proceed; otherwise the admission center's control module calculates the price difference and conveys a message that the age of the visitor needs to be confirmed. This confirmation can be automatically accomplished by the control module while reading the certified DOB data stored in the visitor card or while retrieving the age from a valid ID document presented by the visitor. The document will be scanned by the control module to capture the age information and picture imprinted thereto, or recorded therein. The biometrics box will capture the visitor's physical appearance to be compared against the picture retrieved from the ID document, so as to authenticate the visitor presenting the ID. The confirmation process can also be implemented by a human operator.

Once the data relating to the ticket and the information relating to the age requirements are verified and confirmed, the control module compiles an appropriate admission stamp. This stamp, which includes the time, date, and location the admission was approved, also attaches an electronic receipt including a ticket cancellation notice to the card-based ticket to prevent multiple admission via the same ticket. This receipt and notice will also be communicated with the admission center's database and compared against a list of tickets being admitted so far. If there is a match, a warning message about the existence of multiple tickets with the same seat assignment will be issued by the control module. A stadium representative has to look into and solve this matter; for example, approve a preliminary admission but also update the ticket with the correct seating information. If there is no match, the admission stamp including receipt and notice will be loaded into the card. Admission is now granted because the ticket contains a unique seat location that was not claimed yet by another visitor including the card per se. The cancellation notice will also update the database list with the seating information about the ticket being admitted. In this way, the database will be informed in real-time about all tickets the moment they are used for admission.

Additional data can be loaded into the visitor card at this time as well. The admission center or the event organizer might store in the card a number of attendance points or information relating to promotional activities. Also stored can be security information including identification numbers of the system entities loading data into the visitor card. To augment the card's security features, the cardholder might capture biometrics information and attach it to the admission stamp. The presence of such additional data can also be verified upon presentation of the visitor card and used accordingly; for example, for partial payments or as a free admission. Besides the admission stamp, a permit or license for admission of merchants, security personnel, or administrative staff can also be stored in the card. Such entities or individuals don't need to present for admission a ticket with a valid seat assignment, but the corresponding admission permit or merchant license stored in the card. The control module will verify the date, location, and event the permit or license are authorized for and if valid, repeat the methodology used during the admission of ticket holders. The only difference is that instead of seat assignments, data about a particular permit/license will be compared against the database list that contains all valid permits and licenses.

If no more data needs to be loaded into the card, the entrance gates signals and allows access to the event. The visitor can now pass through the entrance gate, remove or decouple the visitor card, and use the card for additional services. After being admitted to the event, the visitor can also leave and return during the same event without having to pay another admission fee. The visitor would couple the visitor card to the control module installed at the exit gate. The module will check the admission stamp stored in the card and if valid, compile an appropriate exit stamp, and load the stamp together with the time and location of exit into the card. When presented at the admission gate, the exit stamp will be verified and if authentic, grant re-entry to the event. Visitors can also capture their biometrics information and attach it to the exit stamp, so that nobody else can use the visitor card for re-entry. Biometrics can also be used for re-entry if no admission stamp or no seat assignments are stored in the card; this would be the case of security personnel or on-site vendors who may frequently enter and exit the event. By making the exit gate accessible only from the premises where the event takes place, only visitors already on the premises can use the biometrics box installed at the exit gate. In other words, personnel exiting through the gate can load their biometrics into the card via that biometrics box, but visitors from the outside cannot. When storing biometrics information in the card, the control module at the exit gate will add a unique identification number to the captured biometrics; also attached will be the time and location of exit. In this way, the control module at the entrance gate will recognize via that identification number if the biometrics information was actually loaded into the card at the exit gate and if it relates to the event in progress. If affirmative, re-entry is granted; otherwise, free admission is denied.

The admission center database including the visitor card will also store an audit trail about the card-based admission and verification process including data communicated between the card and system databases.

The invention further includes a method for using the visitor card to purchase goods and services offered by the plurality of service providers. The method includes the steps of verifying the card's authenticity, determining if the card-based payment is valid, computing and authorizing the purchase amount, deciding if additional verifications are required, compiling an electronic receipt, clearing payments made via the card, and establishing an audit trail.

Upon presentation for the purchase of goods and services at a merchant location, the visitor card will be coupled to a POS device. The card can now be verified by comparing the authenticity code stored in the card against the authenticity file stored in the system database. If there is a discrepancy, the card will be retained and an appropriate warning message conveyed by the POS terminal. If there is a match, the card is authentic and approved for further service, including as an electronic payment means. The card can also be verified by a portable terminal while comparing the card-based authenticity code against an authenticity file stored in the portable terminal.

The validity of the electronic payment form stored in the card will be determined by verifying the related information including the monetary value associated therewith. This monetary value can be an electronic representation of traditional money, which is backed and endorsed by a financial institution, or a set of digital payment points, which are underwritten by a non-banking entity, such as the event organizer. The payment form including related information can be verified by providing the security information that is used by the bank or underwriter to protect the form. This information will be compared against, or correlated with, the corresponding data stored in the card. If there is a match/correlation, the form's validity is established; otherwise, the form is not authentic. For example, inputting the appropriate identification number and security key, or providing the visitor's security data, will unlock the payment information and activate the digital cash stored in the card.

To pay for a particular purchase made via the card, the purchase amount will be computed and compared against the digital cash stored in the card. If there is enough cash, the purchase amount will be approved by the cardholder and deducted directly from the visitor card while updating the digital cash balance remaining in the card; no on-line authorization calls are necessary. The digital payment will be then forwarded to the merchant/service provider. The received payment will be verified, processed, and credited to the merchant account. If the visitor card simulates traditional payment means, the card will also initiate and implement the required authorization process while communicating with the financial entities authorized to approve such payments. Payment received via the portable terminal from a mobile vendor, can be loaded to the merchant database in real-time or as a cumulation of payments at a later time. The mobile vendor can then request clearance of the electronic payments, including the redemption of payment points, as traditional money.

The merchant can perform additional verifications with respect to the cardholder payment. For example, if a personal electronic check was used for payment, the merchant might want to validate the cardholder's identity, via a certified driver's license stored in the card, or via a traditional ID document presented by the cardholder. The merchant can, for example, verify the driver's license number including expiration date or determine if the picture recorded onto the document matches the cardholder's appearance including the digital picture stored in the visitor card. If a payment was made via payment points stored in the card, the service provider might want to verify if the payment points are valid or if the non-financial entity backing those points is still in business. This can be accomplished by determining the authenticity of the card-based points or by communicating with the entity to have the payment points confirmed before accepting them as payment. Service providers accepting payment points might also want to verify if the points are used properly. For instance, payment points earmarked for telephone calls shouldn't be used to pay for parking fees, and vice versa.

After successful verification and approvals, the service provider accepting the payment made via the visitor card, will compile and load an electronic receipt into the card and related system databases. This receipt represents proof of payment received by providers and includes the time and location, the type of merchandise delivered or service rendered, and the price paid therefor. The receipt can also comprise the identification number or security key of the provider to confirm the provider's identity or to protect the receipt's contents. The receipt further comprises validation codes to authenticate the provided merchandise or service.

Once forwarded via the visitor card, the monetary value can be credited to the service provider's account. If the card-based value represents traditional money, the network transaction processors will clear the payment, so that the financial institution can reimburse the provider accordingly. If electronic payment points were used for the purchase, the points will be forwarded to the non-financial institution who then reimburses the provider. In both cases, the service providers will be reimbursed with traditional money for purchases made via the card. The providers can also keep and re-use the received payments as digital cash. When uploading the electronic payment amounts for clearance, the service providers can also earmark the payments with a security key, so that proper identification and ownership is established with respect to the transferred funds. In this way, the cleared payment amounts can be deposited only to the providers' account.

The service provider databases including the visitor card will also store an audit trail about the verification process, as well as the card-based payments made and information communicated between and among the remote databases including the visitor card.

The invention further comprises a method for facilitating a plurality of value-added services to be rendered via the visitor cards. The method includes the steps of storing service codes in the visitor card, protecting the service codes, requesting a particular service, verifying the particular service, determining the cardholder's service eligibility, rendering the services, and establishing and audit trail.

A set of service codes will be loaded into the visitor card to qualify the cardholder for the plurality of services upon presentation of the card including communication with remote databases. The plurality of services includes services generated in conjunction with the card-based ticket, provided on the premises where the event takes place, delivered via remote means, or facilitated as a combination thereof. For example, ticket related services comprise first right and other priority privileges to purchase additional tickets including the same seat location, automated selection of tickets based upon preferred seat assignments and budgetary price ranges stored in the card, accumulation of attendance bonus points including multiple exit/re-entry during event, or club memberships including a VIP-pass to meet the event performers. On-site services comprise enrollment into promotional activities including communications with the event's database, parking permits including valet parking, telephone cards including special calling fees, capture of biometrics characteristics including imprinting the cardholder's picture, or purchase of discounted merchandise. Remote services comprise inputting seating maps and monetary values into the card, advanced ticket selection including electronic payment, loading event schedules including capabilities to edit a card-based schedule, on-line communications with remote databases including downloading of event related information, ordering goods and services via the card, or subscription to a newsletter and other media containing event related information.

The service codes stored in the visitor card will be protected by entities issuing the card or by service providers, so as to prevent the fraudulent use thereof. The codes can comprise plain text or scrambled data. For instance, the codes can comprise a unique identification number or security key of those entities or providers. The service codes will also be stored in the system databases the card is going to communicate with. As an additional safeguard means, the card containing the service codes, can also be protected via a tamper proof card identification number.

To request the rendering of a particular service, the cardholder will present the card to the service provider or log-on to the appropriate database. For example, the card will be inserted into a card reader or coupled to a provider database via the Internet network. At this time, the card can be authenticated by verifying the identification number stored therein. If the verification is successful, the card is authentic and authorization is granted to proceed therewith; otherwise no service will be provided via the card.

Upon presenting the card, the system will verify if the requested service can be provided via the card. For instance, the authenticity of a service code can be established by verifying the identification number or by attempting to unlock the code associated with the requested service. This can be done automatically via the card's computerized means including the communication means implemented between the card and system databases. If the process of verification or unscrambling is successful, for example, by providing the correct identification number or the correct key, the code is authentic and service can be provided; otherwise, no authorization will be granted to render the requested service.

To ensure that the cardholder is entitled to receive the requested service, the identity of the cardholder can be verified as well. For example, security information provided by the cardholder has to match or correlate to the security data stored in the card and/or system databases. If the verification including comparison is successful, the cardholder is authenticated and qualified to request and receive a particular service.

After verifying the service codes and qualifying the cardholder, services identified by those codes can be rendered to that cardholder. The card can now be used to receive the appropriate services facilitated via the card. For example, to order services and to purchase selected merchandises, pay for the services and goods via the visitor card, communicate with the seating map and other system databases, download data and information to be stored in the card, and to accumulate appropriate bonus points to be used for future services and consumptions.

The service provider's database including the card will also store an audit trail about the storage of service codes, the card usage including the related verification process, and about the data and information communicated between and among the remote system databases including the card.

To better illustrate the above system and methods, let's use the visitor card as an electronic ticket to a sports stadium including related events, a payment carrier including a monetary value for the purchase of goods and services, as well as a host of rights and considerations underwritten by the event organizer and service providers. Also, to guarantee a secure information exchange and to authenticate the card or system data, a cryptography scheme based, for example, upon the public key technology can be implemented; all entities including individuals involved in the exchange or authentication of scrambled data will have an unique pair of keys, a public key known to everybody and a secret private key known only to a particular entity. The public key can include, for example, an unique mailing address or public telephone number, and the private key a secret combination of alphanumeric characters or a biometrics characteristics of an individual. In this way, a sender can communicate secure messages to a receiver while encrypting the messages with the public key of that receiver prior to transmission. The transmitted message can be decrypted only by the corresponding private key of the receiver (e.g. addressee); only the addressee on the envelop can open the envelop and read the letter. Besides, any information encrypted with the private key of a sender can be decrypted only by the corresponding (e.g. sender's) public key; the letter signed via the private key is therefore authentic and was send by that sender.

The public key technology, including the related security protocols employed for communications, can also be used to store a public key certificate in the visitor card. The certificate is tamper proof, cannot be duplicated, and is used to certify or authenticate data and information it is associated with. For example, a particular certification center can load such a certificate into the visitor card as a digital signature; the signature can be attached to a selected card data or associated with a particular information stored at a remote location. Afterwards, the digital signature provided by the visitor card can be used to unlock or unscramble that certified data or information, so that the data/information can be retrieved or downloaded and displayed or printed-out in a plain or legible manner. The fact that the data/information could be accessed or unscrambled with the card-based certificate is proof that it was certified by that particular certification center; if access is denied, the certificate could be a fake or the data/information tampered with. The signature can also automatically "pop-up" when card data or remote information, which is certified via that signature, is retrieved and displayed. Once displayed, the signature can be compared against the official signature of the certification center; this can be done by uploading the signature to the center's database for comparison or by verifying the card-based signature against a list of valid signatures provided by that center. If the comparison/verification is successful, the signature is established to be valid, as well as the card data "signed" therewith to be certified. If scrambled, the signature can be verified by using the certification center's public key to unscramble it; if the signature cannot be deciphered via this public key, the data/information was not signed by that certification center.

The public key certificate can also be used to confirm the identities of visitors and service providers involved in card-based transactions. To allow each party in a transaction to confirm the identity of the other, the electronic certificate stored in the visitor card will be exchanged automatically with the digital certificate stored in the merchant database. In this way, the certificates can authenticate off-line payment transactions, support on-line debit transactions, ensure that the communicated information including monetary values are not altered by an unauthorized entity before it is received by the merchant, and proof that a visitor has indeed initiated a purchase request and forwarded payment, as well as that a merchant has received the payment and provided the product or service.

Let's consider a family of soccer fans arriving at the admission center to purchase tickets for admission to the sports stadium; the group consists of adults, kids and seniors. The visitors can choose from the card tray the card type they would like the tickets to be loaded into. The card type can comprise a particular graphics and text imprinted onto the package and/or a specific amount of prepaid monetary value stored in the card. For example, the selected cards show the logo of the local soccer team on the front and the home schedule with a calendar on the back of the card; as well a mission statement and other promotional information provided by entities renting out space on the card or participating in co-branding schemes implemented via the card. The monetary value stored in the cards is an electronic representation of traditional money and can be used for the purchase of goods and services throughout the stadium.

The seat assignments will be selected from the seating map that engages visitors into an interactive dialogue while displaying the available seat locations. For instance, the visitors will be inquired about the number of tickets, desired seat locations, and the age of the ticket holders. If answers are provided and selections made, the seating map will display the appropriated ticket price and the visitors have to decide which ticket to download into the card. The selected seat assignments will be reserved until adequate payment is provided or a predefined time period has elapsed. After payment is provided or the time is over, the seats will be automatically released for other visitors. For example, the selected seats will be flashing until payment is forwarded—within a reasonable time span to the admission center; while flashing nobody else can select those seats. One of the adults provides payment via a banking credit card; the credit card is inserted into the banking module to facilitate the necessary authorization process and appropriate fund transfer. The credit card will also be used to purchase a set of additional payment points from the event organizer. These points will be stored in the visitor card(s) and afterwards accepted by various merchants as a legal tender.

After proper payment is received by the admission center, the electronic tickets together with a time stamp will be loaded into the visitor cards. Concerning the tickets issued to the kids and seniors, an electronic age stamp will be attached to the card-based tickets to identify the tickets as being purchased at a reduced price. The seat assignments can also be imprinted onto the card package or provided as a label to be affixed onto the visitor card. The admission center will now update the seating map to prevent the selection of the same seat locations by more than one visitor; the seat assignments will also be communicated "as being sold" in real-time to any other ticket office, which sells tickets to the same event. After the game is over, the seating map will be automatically reset, so as to enable the selection of all seats for a new event. The map can also be partially reset at any particular time (e.g. at half time), so as to cancel seat reservations made but not claimed by any visitors within a predefined time period. In addition, the visitors can download the "line up" of the two soccer teams (e.g. name of the players, position they play, their age, and other related information) and store this information in the visitor cards; the information can also be provided as a print out. The visitors can further load personal data and related demographics information into the purchased card(s), as well as protect access to the card contents via a PIN or biometrics information inputted into the card as well.

Next, the admission center will evaluate the selections made and in response thereto, compile and load a set of appropriate service codes into the visitor cards. Such codes comprise, for example, a corresponding number of award points to be used towards parking fees, on-site telephone calls, and purchase of selected merchandises; the higher the ticket price including total amount spend at the admission center, the more award points can be allocated. The admission center can also communicate the ticket selections made, including the visitor's demographics data inputted, to the event organizer's database for statistical purposes and promotional programs. The visitor cards are no ready for admission and can be removed from the card slot including decoupled from the admission center's database.

Upon arrival at the entrance gate, the visitor cards will be presented for communication with the control module. For example, if inserted into the card slot, the control module will verify the seat location, name of the event, date and location the electronic ticket refers to; as well as flag the presence of tickets issued for young and senior visitors. The age of the kids can be verified visually while the age of the seniors via a valid picture ID document. The visual verification can be accomplished by a human gate keeper or via a camera mounted at the entrance gate to capture and communicate the physical appearance of visitors to a remote operator. The visitor's physical appearance can also be compared against a digital picture stored in the card; for example, to verify if the visitor presenting the card is the authorized ticket holder as identified via the card-based picture. The picture ID verification can be accomplished by scanning, via the document reading means of the control module, the ID document presented by the seniors. The age information retrieved from the ID document can be analyzed and compared against the age stamp attached to the card-based ticket. For example, the DOB recorded on the document will be used to calculate the visitor's actual age, so as to determine if a reduced ticket price is justified. The control module will subtract the DOB data from the present date (e.g. year, month, day) provided by the system clock. The resulting age information will be compared with the age requirements (e.g. 65 years or older) provided by the age stamp; the visitor's age can also be certified and loaded into the visitor cards. The picture scanned from the ID document can also be compared against the seniors' physical appearance captured via the biometrics box, so as to verify if the visitor is the legitimate document holder as identified via the photo recorded on the ID document. If the ticket and age verification steps are successful, the control module allows passage; otherwise, a new ticket or a ticket at a regular price has to be purchased before admission is granted. In the case of a traditional entrance gate, a human operator can verify the card or label containing the seating information and related ticket price, as well as determine the age of the visitors, if applicable. The seating and pricing information, which is stored in the card, can also be retrieved and projected onto the control module's display panel.

After admission to the sports stadium is allowed, the appropriate admission stamp will be compiled and loaded into the card. This stamp prevents the use of the electronic ticket for multiple admissions to the same event, unless an appropriate exit stamp, which allows re-entry to the same event within a reasonable time period, is stored in the card as well. The admission stamp can also update the seating map projected onto the stadium display, so as to show the status of seats as they are filled-up; the stadium display can also contrast the cumulative seat assignments sold so far. Based upon this stamp, the control module can count the individual admissions, as well as compile the attendance record at any particular time.

The control module will also gather marketing data and related information about visitors entering the stadium; as well as make appropriate decision based thereon, including forward such data and information to the appropriate system entities. For instance, one of the kids is counted to be the 10,000th visitor and eligible to a free T-shirt showing all players with their autographs. The seating map will also be informed at half time about all tickets used for admission. The seating map compares those tickets against the list of reserved tickets and identifies, for instance, 900 seat assignments as being reserved but not purchased yet; these 900 seat locations will be made available to other visitors for a reduced purchase price. As a function of the overall terms, even tickets paid for, but not used for admission within a predefined time period, can be forfeited and sold to other visitors. In addition, the control module also communicates the attendance record to the stadium administrator, so that the number of visitors can be announced in real-time at any time including at the end of the game.

After successful verification, the visitors will pass through the entrance gate while removing, including decoupling, the visitor cards from the control module. Upon entering the stadium's premises, the visitors can locate their seats on a stadium display unit before proceeding to their seats. This display unit illustrates the floor plan of the stadium including a "you are here" marker to be used as reference. The visitors can insert their cards into a card slot mounted on the display unit for the purpose of visualizing their card-based seat locations. The unit reads the seat assignments stored in the card and flashes the corresponding locations on the floor plan; the flashing will stop upon removal, including decoupling, of the card. The display unit can also trace onto the display unit's screen alternative routes about how to get to the seats starting from the marker. For example, the unit can lay out the corresponding trail while animating via video and audio signals the directions to be followed.

The adult visitors also decide to have their age verified and stored in the card, so as to use the card afterwards for the purchase of alcoholic beverages. These visitors present their cards and a valid ID document to an authorized operator. The operator verifies the DOB recorded on the ID document and loads into the card a certified age stamp comprising the cardholder's DOB data; the cards are then handed to the visitors. To ensure that the age stamp will be used only by visitors entitled to do so, the operator can also store the visitor's picture on the card, as well as imprint it onto the card package. If already imprinted on the card, the visitor's picture will be compared against the physical appearance of, including the photo ID presented by, the visitor; if the pictures match, the DOB data will be loaded into the visitor card. Further stored in the card can also be any other biometrics information or data that uniquely identifies the cardholder authorized to use the age stamp. In this way, visitors can store their DOB data into any card, including cards showing the picture of a different visitor; as long as the card-based DOB can be unlocked and retrieved via the unique data/information provided by those visitors. When presented, for example, for the purchase of beer, the card will be inserted into the POS terminal and the age stamp stored therein will be verified. The terminal checks the stamp's authenticity and if authentic, computes the visitor's age by subtracting the DOB data included in the stamp from the present date provided by the terminal's computer clock. If the age is at least 18/21 years, the purchase is approved; otherwise, a message conveyed that no beer can be sold to that cardholder. In the case, the card-based DOB is protected via the visitor's biometrics, the cardholder has to provide the identical biometrics as well. The biometrics stored in the card will be compared against the "live" one provided by the cardholder, and if there is a match, the purchase will be confirmed; otherwise, service will be denied. The purchase of beer will also be denied if the card-based picture does not match the cardholder per se; unless the above biometrics verification is successful. After approval, the monetary value stored in the card will be used to pay for the beer; the value will be deducted in the card and forwarded to the merchant. The merchant communicates the payment received to the transaction processor for clearing purposes. The other visitors purchase soft drinks and hot dogs while also paying via the monetary value stored in their cards. In addition, the kids buy a pair of T-shirts while paying via the award points loaded during admission into the card.

The above methodology used to prevent the sale of alcoholic beverages to minors, can also be employed outside the stadium (e.g. on a nationwide basis). A certification center, such as a Government agency or public office, will verify the age of a person, certify the age-related information, and store the DOB data together with a certificate of authentication in the visitor card. The verification process can be implemented by verifying a photo ID presented in person to a clerk at the certification center, or by identifying via an on-line means the person requesting certification from a remote location. The latter identification can be accomplished, for example, by capturing and uploading the person's biometrics information and comparing it against biometrics data stored in a Government database. Demographics data or other visitor information can also be uploaded and compared against the database data. If there is a match, then the person requesting the certification service is positively identified; otherwise, no service will be provided. After successful verification, the clerk will retrieve the DOB data recorded on the document, or download the DOB data from the database containing the age-related information about the person identified via the on-line means, and load the DOB data into the visitor card. Also stored in the card will be the certificate of authentication that is tamper proof and cannot be duplicated. In the case of a remote certification process, the clerk will also communicate the person's biometrics information together with the DOB data onto a data communication link, so that the DOB data can be retrieved and used only by the person previously identified. In other words, to be able to load the DOB data into the visitor card, a person attempting to download the DOB must provide the identical biometrics used previously by the certification center to identify that person. If the provided biometrics matches the biometrics communicated onto the data link, the DOB together with the certificate of authentication and biometrics can be stored in the card; otherwise, no storage is allowed. The biometrics can comprise any unique characteristics of the cardholder such as fingerprints, eye retina, voice imprint, or facial appearance; the picture can also be imprinted onto the card package. Besides, if under-aged persons try to purchase alcoholic beverages via the card that was issued to an adult, they must provide the matching biometrics as well; which they can't and therefore no sale will be allowed.

When presented for purchase of alcoholic beverages, the merchant's POS terminal will read the certificate of authentication stored in the visitor card, and use the certificate to access or unlock the DOB data. The unscrambled DOB information will be compared against the date (e.g. year, month, day) provided by the terminal's computer clock, and if the computed age is at least 18/21 years old, approve the purchase. The card-based DOB can also be displayed and verified by the sales clerk. To further ensure that the age certificate is presented and used by the rightful cardholder, the sales clerk can also verify the biometrics, if any, stored in the card including attached to the certificate. For instance, if the cardholder's fingerprints are stored in the card, the cardholder's "live" fingerprints will be captured via the biometrics box and compared against the prints stored in the card. If the cardholder's picture is stored in the card, the sales clerk will capture the customer's picture and compare it against the card-based digital picture. The digital picture can also be displayed to be compared with the photo imprinted onto the card or with the cardholder per se. If the comparison is successful, the age information stored in the card is authenticated and determined as relating to the cardholder. This process can be further automated by ear-marking every alcoholic beverage to be sold to the public with an appropriate merchandise code. When merchandise items are passed through the check-out scanner, the POS terminal can electronically verify the codes scanned from the items and if such a code is detected, request proof of age. If positive proof is provided (e.g. via the card), the purchase is approved; otherwise, the merchant instructed to deny the sale. Note that, if there is no doubt about the customer's age, such proof won't be necessary; the sales clerk can instruct the POS to stop verifying the merchandise codes. The POS terminal will also compile a tamper proof audit trail as proof of compliance with the laws forbidding sale of alcohol to under aged persons; in the case of disputes or during regular inspections, one can determine therefore if the laws were violated by a particular merchant.

To verify the above age information, several certification methods can be used. The certificate of authentication and the DOB data certified therewith, can be stored in the visitor card as plain or scrambled data formats. A plain certificate can be verified against the official certificate(s) maintained by the certification center; for example, communicated and compared with the certification center's database, verified by the POS against a list of valid certificates, or inspected by the sales clerk. A scrambled certificate can be used as is or unscrambled via a security key provided by the certification center; for example, to read the DOB data or to unscramble the certificate's contents via the center's public key. The DOB information can also be stored in the card as plain or scrambled data. The DOB will be accessed or unscrambled via the card-based certificate and, in response thereto, displayed as plain data or communicated as is. In the above context, several levels of verification can be used. With one security level, the card-based certificate will be read and used to retrieve or display the certified DOB data. With two levels, the cardholder's biometrics or security key will be provided as well. For example, the fingerprints or secret key of the cardholder will activate the DOB data—if they match the fingerprints or correlate to the public key stored in the visitor card—so that the DOB can be afterwards retrieved or displayed via the certificate. With three levels, the certification center also includes its security key with the DOB data. To gain access to the DOB data, the cardholder's biometrics information or security key (e.g. secret key) plus the center's security key (e.g. public key) have to be provided. To display, including retrieve, the DOB data this time, the provided biometrics has to match the card-based biometrics or the cardholder's secret key has to correlate with the cardholder's public key, plus the center's public key has to correlate with the center's secret key used to protect the DOB data.

The visitors proceed now to their seats; the game is just to start. As time goes by, the kids want to purchase some ice cream without having to leave their seats; the home team had several chances to score and nobody wants to miss the goal when made. The kids insert the visitor card into the communication slot under the seat, call upon one of the mobile vendors, and state their order. The vendor conveys the required payment and the kids input the appropriate payment amount, while deducting the amount from the monetary value stored in the card. The payment will be forwarded onto the data communication link passing under the seats. The vendor couples the portable terminal to the data link via the input/output means installed at the end of the row the kids are in, accepts the payment, and hands the merchandise to the kids. The vendor can also compile and communicate or print-out an electronic receipt, and stick the receipt onto the ice cream box. If a wireless data communication link is deployed, the mobile vendors can communicate with the data link without having to log-on to the row where the customer is seated. The seats can also feature a mini-display that communicates with the data link that accepts purchase orders. For example, a touch-screen allows the kids to select the ice cream from among a merchandise list showing the type of available fast food items including the required payment amounts. Once a selection is made, the display will compile an electronic order that comprises the type and quantity of merchandise ordered, the payment provided, and the particular seat location the order was placed from. In this way, any mobile vendor acknowledging the order can deliver the selected item to the visitor as identified by that particular seat location.

Down the road, the visitors decide to have their picture taken by the stadium camera while sitting in the bleachers. This request will be placed similar to the one used to order the ice cream; the card inserted into the data link, an appropriate request forwarded, and proper payment provided. In response to the request, the stadium camera will zoom in to the group of visitors identified by their seat location, and take their picture. This digital picture can be downloaded into the visitor card(s), as well as displayed onto the seat's mini-display or on the stadium's score board. Such a display can also be used to pre-approve the moment the picture should be taken, including to provide instructions to the stadium camera to further zoom in or zoom out. In the same context, a full motion picture can also be ordered; the camera would record the group of visitors over a predetermined time period.

As half time arrives, a few of the visitors decide to make some phone calls via the visitor card. The card will be inserted into the telephones installed throughout the stadium and the card-based telephone service codes/points deducted to co-pay for the calls. The telephone company can redeem the accepted points in exchange for traditional money upon communication of the service codes to the event organizer. Other visitors wait for a drawing to find out if they won two free tickets to a future game. The winning tickets will be announced including displayed onto the stadium's score board. The visitor holding that ticket inserts it into the data link, the stadium display flashes the seat location, and the stadium camera zooms in to the visitor descending to the playing field to pick up the free tickets. Our family further decides to compile a security kit for their youngest child and to store the kit-related information in the visitor card. The purpose of this undertaking is to provide the authorities with the child's background information in the case of a kidnapping. The visitor card will be inserted into the card slot of, including coupled to, a card service center to start a dialogue via the center's multimedia module. For example, the child's demographics data including address and phone number, as well as physical appearance including height and weight, will be entered. Also inputted will be the child's picture and other biometrics information, such as fingerprints and voice imprints; the digital picture can also be imprinted onto the visitor card as an analog photo. The data and information inputted via the multimedia module will be stored in the visitor card as well as communicated with the local police office.

Half time is now over and the visitors return to their seats to watch the second half; the home team leads by two goals, the visiting team has yet to score. After a few minutes, a visitor has to leave the stadium to meet a friend; but intends to return to the stadium shortly thereafter. The visitor presents the card at the exit gate to the control module that verifies the admission stamp stored in the card and if successful, stores an appropriate exit stamp together with the time of exit in the card. When the card is presented for admission; the control module at the entrance gate verifies the card-based exit stamp, including the time and place of exit, and allows to visitor to re-enter without having to pay any admission fee. The game is now almost over, but both the home and visiting team still score a goal. The game ends with an overall score of 3-to-1 in favor of the home team. This score and other statistics such as name of the players who made or assisted with the goals; number of corner kicks, faults and of yellow/red cards; time of possession; or shots towards the goal will be made available via the card service centers and stadium display boards. Visitors interested in downloading into their card such information can do so, by inserting the visitor card into the card slot at the service center or by communicating with the stadium database. Happy about the win, the visitors proceed now to the parking lot to pick up their cars. When passing through the exit ramp of the parking lot, the visitor card will be inserted and used as a co-payment for the parking fee. Once deducted from the visitor card, the parking points will be erased, so as to prevent the multiple use thereof. The parking lot administrator can now communicate the accepted parking points to the event organizer to be exchanged into traditional money.

The visitor cards can also be used for remote services. For example, a few visitors decide to buy a season pass after arriving at home. The visitors can go on-line with the seating map, or any other remote database authorized to provide electronic seat assignments, select the seat locations, pay for the selections, and download the season ticket(s) into the visitor card. The on-line dialogue can be accomplished via the cards computerized communication means or by any other computer terminal including a card read/write device. The seating map manages the overall ticket sales while coordinating all seat allocations made via the map including any database communicating therewith. In this way, a seat sold via a particular database, will instantly update the seating map's master database, so as to prevent the multiple sale of the same ticket via any other slave database. Instead of the master-slave database scheme, any other database configuration including a network of distributed databases can be used as well; the seat sold by a particular database component will be communicated in real-time to the rest of components and instantly removed from the list of available seats. From the time a seat is selected to the moment adequate payment is provided therefor, the seat cannot be sold to another visitor; if payment is not provided within a predefined time period, the seat selection will be cancelled. The visitors can further automate the seat selection process while storing a set of preferred seat locations or budgetary pricing into the card before buying a particular ticket. When ordering the season pass, the visitor card will communicate the preferred seat locations, or desired price range for the tickets, to the seating map. The map will evaluate the request and assign the corresponding seating arrangements; if the requested seats are not available, the map will assign nearby seat locations. The nearby seats can be assigned implicitly or as pending approval from the visitor. In the later case, the visitors would instruct the map to confirm or cancel the suggested seat selections. In the same context, if the desired price range cannot be met, the seating map will inform the visitors about an alternative ticket price and the visitors will confirm or reject the new price. In addition, the seating map can also be downloaded into the card or computer terminal, so as to display the seating locations while allowing the visitors to point to, including to input, the specific seats they want to reserve. The seat selections will be forwarded to the seating map or remote databases and in response thereto, a request for payment will be communicated to he visitors. After adequate payment is provided, the seat assignments together with related information, such as date and location the events take place, will be downloaded into the visitor card; the season ticket is now ready for use including admission.

Visitors can also store via remote means the DOB information of their kids in a visitor card to validate future admissions at a reduced ticket price. For example, they log-on via a data communication link to the county office and access the database containing the birth certificates of all residents. After proper identification is provided, the DOB information can be downloaded into the visitor card. The identification means comprises, for example, the capturing via the biometrics box and uploading via the data link the children's "live" fingerprints. If the child's fingerprints match the biometrics information, which is stored in the county database and associated with the birth certificate, the DOB can be retrieved and stored in the visitor card; otherwise, no retrieval is allowed. The county database can also certify the DOB information and communicate the certified DOB onto the data link.

Another remote service relates to the communication with the event organizer's database for the purpose of downloading more data and information about sporting events, the latest news, or player information. This data and information can be viewed, manipulated and/or stored via a computer terminal including the visitor card. For example, the schedule of all home and out-of-town games can be retrieved, updated as the games are played, and loaded into the visitor card. The schedule comprises the date, time and location the teams are playing at, the name of the team members and coaches, and a field for inputting the score and other game or player related statistics. The visitors can also download or order other game statistics, player autographs, video clips from selected games, newsletters and brochures, or interviews with sports officials. If payment is required, the visitor card can be used to pay via the monetary value stored in the card for the retrieval and usage of the database data.

In addition, visitors subscribing to a GPS (Global Positioning System) service can retrofit their visitor card to facilitate communications with the GPS provider. The computerized means required for the transmission and reception of signals between the card and GPS-based satellites, can be provided by the card per se or by appropriate transmitter/receiver modules installed throughout the stadium. When the satellite receives the request for positioning from the card, it will determine the position of the cardholder, and transmit the positioning coordinates to the card. These coordinates can be translated and displayed accordingly; for example, illustrated as an "x" sign, with or without the numerical coordinates, on the stadium floor plan or onto the seating map previously stored in the visitor card. The cardholder's position can also be communicated to and projected onto the stadium's display board as the "you are here" mark, including directions about how to proceed to the seats. The GPS capability can also compile a dynamic track, including velocity and time, of the visitors as they proceed to their seats. This mobile track can be displayed onto the visitor card or stadium display, while illustrating any deviation from the directions that are recommended by the card-based seating map or displayed by the remote display units including the floor plan of the stadium.

The system and methods will be used throughout the leisure industry, including by visitors attending a plurality of events, by event organizers, and by providers of services and goods. The portable visitor card facilitates the admission to the events and the consumption of related goods and services. The card can also be used to control access to computers including communications networks and database contents, as well as to facilities or activities requiring proper use rights. The visitor card is reusable while allowing the storing and manipulation of use rights, the personalization of the card contents, and the reloading of monetary values.

The invention improves the operating efficiency and increases the sales revenues of event organizers and service providers. The ticket purchase and admission process will be automated, which reduces the administrative overhead costs, leads to a faster throughput at the ticket office and entrance gates, and cuts down on fraud via the enhanced security provided by the visitor card. The electronic payments, triggered and executed via the visitor card, result in reduced telecommunications and lower handling costs as compared to plastic/paper-based payment means. Higher revenues will be achieved by allowing the visitors to earn frequent attendance and shopper points, which will lead more loyal visitors and increased spending habits. By accepting electronic cash and payment points, the service providers can take advantage of float income (i.e. unused monetary value left in the visitor card).

The visitor card can also be used to generate incremental sales for the card issuers. The visitor card can be used, for example, to rent out card space to corporate sponsors that want to promote their products including convey a message to the visitors. Such sponsors pay a fee to the card issuer in exchange for having information about a particular product or service imprinted onto or stored in the card. The visitor card can also be used for co-branding schemes or cross-promotional activities; for example, as a visitor card featuring on the same card package a bank's logo with a picture of the sports stadium.

The invention also facilitates the rendering of a plurality of services with the same visitor card. This allows the cardholder to use the card not only for admission but also for the delivery of a broad range of goods and services such as fast food items, general merchandise and souvenir items, parking, telephone calls, proof of age, automated seat selections, wireless communications, computerized positioning of a cardholder, and other remote services. These multi-service capabilities are enhanced by the convenience of having a card-based payment means with cashless money management functions.

The system entities can also gather and compile a set of marketing data about attendance records and preferred consumptions of visitors. In this way, better marketing intelligence about the card usage is made available to the card issuers and acceptors, so that promotional campaigns and specific sales programs can be tailored to the needs and wants of those visitors.

The invention claimed is:

1. A portable card to be used in connection with a sporting event, the card comprising:
   a memory for storing a card data including an electronic ticket valid for said sporting event in the card;
   input/output means for entering into or retrieving from the card data including said electronic ticket; and
   decisioning means comprising a computer program embedded into the card;
   said computer program comprising a means for automatically processing, by the card, said card data including information relating to said electronic ticket.

2. The card in claim 1, wherein said portable card comprising a means for displaying including conveying by the card a functional command button for activating said decision means including manipulation of said event ticket.

3. The card in claim 1 wherein said portable card is a smart card comprising said memory including said event ticket, said input/output means, and said decision means.

4. The card in claim 1 wherein said portable card is a handheld device including a pocket-size computer comprising said decision means for processing by the card the card-based ticket.

5. The card in claim 1, further including:
   means for automatically earmarking by the card said electronic ticket so as to qualify a cardholder including the card for a particular service;
   means for subsequently coupling the card to a sporting event provider database;
   means for uploading by the card the earmarked ticket to the database and for requesting by the card from the database rendering of said particular service; and means for enabling by the card rendering of the requested service;

said particular service comprising access to said sporting event;

said enabling means comprising a means for automatically unlocking by the card the earmarked ticket previously stored in the card.

6. The card in claim 5 wherein said particular service further comprising a means for storing in the card a parking permit to be used for sporting event-related parking; the means comprising:

means for coupling the card to a sporting event organizer database;

means for storing in the card a set of parking points downloaded by the database;

means for subsequently coupling the card to a parking database and for automatically uploading by the card at least a parking point to the database to pay for said sporting event-related parking; and means for automatically cancelling by the card the card-based parking point upon uploading by the card the point to the database.

7. The card in claim 1, further including:

an instruction display window comprising a means for assisting the card user in implementing a data operation with said card data template including said event ticket valid for said sporting event; said assisting means comprising:

means for automatically displaying onto the card said card data template available for selection;

means for automatically selecting by the card a particular card data including sporting tickets;

means for displaying onto the window a menu of operational tasks executable with the selected card data; said displaying means comprising:

means for recommending about how to proceed with a particular data processing task; and means for conveying the outcome the particular task would have if executed; and means for executing a specific task and for subsequently explaining the card's operational status derived from the execution of said specific task.

8. The card in claim 1, further comprising a sporting event data section, the data section comprising:

a ticket data relating to a particular sporting event;

means for displaying including conveying by the card a status of card-based tickets including said ticket data; said status comprising a date and seat assignment previously issued by a seating map for the sporting event; and means for coupling the card said sporting event data section to said seating map authorized to issue tickets; said coupling means comprising:

means for automatically requesting by the card an updated including new ticket; and means for storing by the card said updated ticket downloaded by the map into the card.

9. The card in claim 8, further including a means for swapping a card-based ticket between at least two cards; comprising:

means for coupling a first multi-service card to a second multi-service card;

means for communicating by the first card said date, previously stored in the first card's sporting ticket, to the second card;

in response to communicating the ticket, means for automatically storing by said second multi-service card the communicated sporting ticket including said date into the second card; and means for automatically cancelling by said first multi-service card said date stored in the first card.

10. The card in claim 1, further including a payment data section; the data section comprising:

a monetary value available via a specific payment form stored in the card; and means for automatically displaying by the card a set of payment form related information; the information comprising:

a maximum amount of debit/credit stored in the card and available via the payment form;

a total spending amount stored in the card and comprising the amount of debit/credit value consumed so far via the card-based payment form;

means for subsequently subtracting by the card the spending amount from said maximum amount to yield a remaining balance of value still stored in the card and available via said specific payment form; and means for displaying including storing by the card said remaining balance as said monetary value in the card.

11. The card in claim 10 wherein said specific payment form is earmarked with a security key by a payment underwriting entity to identify a legitimate user of the form, the card comprising:

means for storing by the card the earmarked payment form including said security key in the card; and means for subsequently automatically comparing by the card the card-based security key with a key inputted into the card; and means for automatically unlocking by the card the card-based form for usage if the comparison is successful; and means for preventing by the card use of the form if the inputted key does not match the key previously stored in the card;

said security key comprising a particular biometrics characteristic of said legitimate user;

said key comprising a life biometrics characteristic provided by a particular cardholder.

12. The card in claim 10, further including means for determining if said remaining balance can be used to pay for a particular sporting good or service including said electronic ticket; comprising:

means for inputting into the card a purchase price for said particular sporting good or service including said electronic ticket; and means for automatically comparing by the card the inputted price with said remaining balance; and if said remaining balance is equal to or greater than said purchase price, then:

means for augmenting by the card said total spending amount by an amount equal to said purchase price;

means for subtracting by the card the augmented spending amount from said maximum amount;

means for storing by the card the difference as the new remaining balance into the card; and means for subsequently providing by the card-based form a specific monetary amount equal to said purchase price; and otherwise, means for increasing said remaining balance, comprising:

means for coupling the card to a remote banking database and for requesting by the card an additional payment means to provide for said purchase price;

means for accepting by the card the payment means downloaded by the remote database;

means for automatically increasing said maximum amount or decreasing said total spending amount via the downloaded payment means; and means for automatically re-computing the corresponding remaining balance and for storing the yielding balance in the card.

13. The card in claim 12 wherein said specific monetary amount—provided via said specific payment form to pay for the sporting good or service including the ticket—is earmarked with a merchant key to identify a merchant intended to receive the payment, comprising:

means for earmarking by the card said specific monetary amount with said merchant key; and means for coupling the card to said merchant's database and for uploading by the card the earmarked payment amount to the database;

said coupling means comprising means for automatically unlocking the earmarked payment via a specific key downloaded into the card by a particular merchant; and if successful including if said specific key matches said merchant key previously used to earmark the card-based monetary amount, then means for authorizing the card to transfer said specific monetary amount to said particular merchant; and otherwise, means for denying payment including access to the card-based monetary amount by said particular merchant.

14. A method for automatically monitoring admission to a sporting event, comprising the steps of:

storing in a portable card a sporting ticket comprising event-related information including date of said sporting event said sporting ticket is valid for;

subsequently coupling the card to a sporting event admission database including an access control module, and uploading by the card the ticket to the control module;

verifying the uploaded ticket by the control module; and if successful, then automatically compiling an admission stamp by the database;

downloading by the database the stamp into the card and admitting by the control module the ticket-holder to said sporting event based upon said admission stamp; and subsequently cancelling including automatically earmarking by the card said sporting ticket with said admission stamp to prevent multiple admissions to said sporting event via the same ticket.

15. The method in claim 14 wherein said portable card is a smart card comprising database storage and data communication means, for storing in and retrieving from the card said event-related information.

16. The method in claim 14 wherein said portable card is a handheld device including a pocket-size computer comprising an embedded computer program for manipulating by the card the card-based ticket.

17. The method in claim 14, further including the step of automatically compiling by the card a particular ticket to meet a specific criteria, comprising:

loading into the card a ticketing data including said specific criteria comprising a preferred seat location or predefined ticket price;

subsequently coupling the card to a sporting event reservation database and automatically uploading by the card said ticketing data to the database;

in response thereto, automatically compiling by the database said particular ticket based upon the criteria uploaded via said ticketing data; and downloading by the database the compiled ticket and storing the ticket into the card.

18. The method in claim 17, further including the step of compiling by the reservation database an alternate seat location or ticket price for said particular ticket, the step comprising:

communicating by the card the selected seat location to said event reservation database;

in response to uploading by the card said specific criteria, automatically determining by the database a seat that is available nearby said preferred seat location, or at a comparable price with said predefined ticket price; and downloading by the database the determined seat and storing into the card said seat as said alternate seat location.

19. The method in claim 14 wherein said step of verifying the uploaded ticket by the control module, comprising validating a discounted ticket issued to a ticket-holder based upon a predetermined age requirement; the step comprising:

automatically locating by said sporting event admission database a particular ticket-holder's date of birth (DOB) previously attached to said sporting ticket stored in the card;

automatically subtracting the DOB located in and provided by the card from a date provided via the database and determining the result as being the age of said particular ticket-holder; and comparing the resulting age against said predetermined age requirement previously stored in the database; and if there is a compliance, then allowing said discounted ticket to be used by said particular ticket-holder; and otherwise, conveying a message that said discounted ticket shouldn't be used by the holder, because said particular ticket-holder is not said ticket-holder.

20. The method in claim 14 wherein the step of verifying the ticket uploaded to the database comprising the step of preventing the use of multiple tickets for the same seat, comprising:

comparing by the card a specific seat assignment, previously included in said admission ticket, with a database list of tickets admitted so far; and if the specific seat matches a ticket from said database list, then conveying by the card a message about more than one ticket being presented with the same seat assignment; and otherwise, updating by the database said database list to indicate that a ticket with said specific seat assignment has been used for admission.

21. The method in claim 20 wherein the step of updating said database list comprising:

communicating by the card said specific seat assignment to a seating map display installed at a stadium said sporting event takes place; and marking onto the map the status of seats as they are filled-up; said marking step comprising conveying including displaying the cumulative number of ticket-holders admitted so far.

22. The method in claim 14, further including the step of authorizing via the card-based ticket a ticket-holder to exit from, and re-enter, said sporting event for free; comprising:

subsequently coupling the card to a sporting event exit database including an exit control module, so as to temporarily leave said sporting event;

compiling and downloading by the exit database an exit stamp into the card;

further earmarking by the control module said admission ticket with said exit stamp to allow re-entry within a predetermined time period;

subsequently coupling the card to said sporting event admission database including said access control module and uploading by the card said exit stamp to the admission database; and verifying by the admission database said exit-stamp uploaded by the card; and if successful, then permitting re-entry of said ticket-holder via said admission ticket including said exit stamp; and otherwise, denying free admission for said ticket-holder.

23. The method in claim 14, further including the step of using a global positioning means, within the premises said sporting event takes place, to direct cardholders to their seats; comprising:

displaying a seating map comprising a particular seat location retrieved from said admission ticket previously stored in the card;

coupling the card to said global positioning means and determining by the positioning means a position of the cardholder within said premises at a specific moment;

displaying said position onto the card;

conveying including displaying onto the card directions about how to proceed from said position to said particular seat location; and compiling and displaying onto the card a dynamic track of the consecutive positions taken-up by the cardholder proceeding toward the seat.

\* \* \* \* \*

UNITED STATES PATENT AND TRADEMARK OFFICE
CERTIFICATE OF CORRECTION

PATENT NO. : 6,999,936 B2  
APPLICATION NO. : 09/067093  
DATED : February 14, 2006  
INVENTOR(S) : Richard P. Sehr Page 1 of 1

It is certified that error appears in the above-identified patent and that said Letters Patent is hereby corrected as shown below:

In Claim 1 (see column 38, lines 37-47):

in line 39, the first element of claim 1, insert the word --template-- after the word <data> and before the word <including>; and delete the last word "electronic" and replace it with the word --event-- in line 42, the second element of claim 1, delete the word "electronic" and replace it with --event-- in lines 43-47, delete the third and fourth elements of claim 1 starting with "decisioning means…" to and ending "… said electronic ticket" and add instead the following: --decision means including a self-contained means for determining by said portable card if said event ticket is valid, in response to inputting into the card a set of appropriate information by a sporting event staff, and with no need for online verification and authorization from a remote entity--

In claim 5 (column 38, lines 59+), in line 61, delete the word "electronic" and replace with the word --event--

In claim 8 (column 39, lines 45-59), in line 53, the third element of claim 8, insert the word --by-- after the word <coupling> and before the word <the>.

In claim 12 (column 40, line 43+), in line 48/49, the preamble of claim 12, as well as in line 51/52, the first element of claim 12, delete each of the word(s) "electronic" and replace with --event-- in such lines.

Signed and Sealed this

Eighteenth Day of July, 2006

JON W. DUDAS  
*Director of the United States Patent and Trademark Office*